US011638283B2

(12) United States Patent
Yoshimura et al.

(10) Patent No.: US 11,638,283 B2
(45) Date of Patent: Apr. 25, 2023

(54) USER EQUIPMENT, BASE STATION DEVICE, AND COMMUNICATION METHOD FOR DCI-BASED RESOURCE ALLOCATION

(71) Applicants: SHARP KABUSHIKI KAISHA, Sakai (JP); FG Innovation Company Limited, Tuen Mun (HK)

(72) Inventors: Tomoki Yoshimura, Sakai (JP); Shoichi Suzuki, Sakai (JP); Wataru Ouchi, Sakai (JP); Liqing Liu, Sakai (JP); Taewoo Lee, Sakai (JP); Hui-Fa Lin, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 73 days.

(21) Appl. No.: 17/054,509

(22) PCT Filed: May 10, 2019

(86) PCT No.: PCT/JP2019/018810
§ 371 (c)(1),
(2) Date: Nov. 10, 2020

(87) PCT Pub. No.: WO2019/216430
PCT Pub. Date: Nov. 14, 2019

(65) Prior Publication Data
US 2021/0195620 A1 Jun. 24, 2021

(30) Foreign Application Priority Data
May 10, 2018 (JP) .............................. JP2018-091541

(51) Int. Cl.
*H04L 5/00* (2006.01)
*H04W 72/1273* (2023.01)
(Continued)

(52) U.S. Cl.
CPC ....... *H04W 72/1273* (2013.01); *H04W 24/08* (2013.01); *H04W 72/0453* (2013.01);
(Continued)

(58) Field of Classification Search
None
See application file for complete search history.

(56) References Cited

U.S. PATENT DOCUMENTS 8,917,682 B2 * 12/2014 Yang ..................... H04W 72/23
370/328
9,860,885 B2 * 1/2018 Aiba ..................... H04W 72/23
(Continued)

FOREIGN PATENT DOCUMENTS

WO 2018/075828 A1 4/2018

OTHER PUBLICATIONS

Huawei, HiSilicon, "Remaining issues on DCI contents and formats", R1-1803707, 3GPP TSG RAN WG1 Meeting #92bis, Sanya, China, Apr. 16-20, 2018.
(Continued)

*Primary Examiner* — Sithu Ko
(74) *Attorney, Agent, or Firm* — ScienBiziP, P.C.

(57) ABSTRACT

A terminal apparatus includes: a higher layer processing unit configured to configure, in the serving cell, the first set of downlink resource blocks (DL RBs) continuous in a frequency domain and the second set, which is different from the first set, of DL RBs continuous in the frequency domain; and a receiver configured to monitor a first PDCCH with a first DCI format in the first set, the first set being activated, and receive a PDSCH scheduled according to the first DCI format in the first set, wherein in a case that the number of different sizes of DCI formats monitored by using a C-RNTI in the serving cell exceeds three, a size of a first frequency domain resource allocation field included in the first DCI
(Continued)

format is provided based on the number of the RBs in the second set, and the first frequency domain resource allocation field is used for scheduling the RBs in the first set.

6 Claims, 13 Drawing Sheets

(51) Int. Cl.
*H04W 76/11* (2018.01)
*H04W 24/08* (2009.01)
*H04W 72/0453* (2023.01)
*H04W 72/23* (2023.01)
*H04W 72/50* (2023.01)

(52) U.S. Cl.
CPC ......... *H04W 72/23* (2023.01); *H04W 72/535* (2023.01); *H04W 76/11* (2018.02)

(56) References Cited

U.S. PATENT DOCUMENTS

| | | | | |
|---|---|---|---|---|
| 10,205,575 | B2* | 2/2019 | Han | H04L 5/0007 |
| 10,412,635 | B2* | 9/2019 | Dai | H04W 16/14 |
| 10,568,110 | B2* | 2/2020 | Xu | H04W 72/12 |
| 10,772,123 | B2* | 9/2020 | Zhang | H04W 74/004 |
| 10,952,199 | B2* | 3/2021 | Kim | H04L 5/0094 |
| 11,265,859 | B2* | 3/2022 | Park | H04L 5/0091 |
| 11,419,110 | B2* | 8/2022 | Ibars Casas | H04W 72/0413 |
| 2010/0331030 | A1* | 12/2010 | Nory | H04W 72/042 455/63.1 |
| 2014/0036840 | A1* | 2/2014 | Yang | H04L 5/0041 370/329 |
| 2018/0279289 | A1* | 9/2018 | Islam | H04W 72/0446 |
| 2019/0082431 | A1* | 3/2019 | Yi | H04L 5/0057 |
| 2019/0222404 | A1* | 7/2019 | Ang | H04L 5/0041 |
| 2019/0297605 | A1* | 9/2019 | Kim | H04L 5/0044 |
| 2019/0313377 | A1* | 10/2019 | Abdoli | H04L 1/0046 |

OTHER PUBLICATIONS

Vivo, "Remaining issues on DCI formats", R1-1803830, 3GPP TSG RAN WG1 Meeting #92bis, Sanya, China, Apr. 16-20, 2018.

"New SID proposal: Study on New Radio Access Technology," RP-160671, NTT docomo DOCOMO, Inc., 3GPP TSG RAN Meeting #71, Goteborg, Sweden, Mar. 7 to 10, 2016.

3GPP TS 38.101-1, "3rd Generation Partnership Project; Technical Specification Group Radio Access Network; NR; User Equipment (UE) radio transmission and reception; Part 1: Range 1 Standalone (Release 15)", V15.1.0 (Mar. 2018).

3GPP TS 38.101-2, "3rd Generation Partnership Project; Technical Specification Group Radio Access Network; NR; User Equipment (UE) radio transmission and reception; Part 2: Range 2 Standalone (Release 15)", V15.1.0 (Mar. 2018).

* cited by examiner

Figure A: Table of number of OFDM symbols per slot $N_{symb}^{slot,\mu}$ for subcarrier spacing configuration $\mu$ and normal cyclic prefix

| $\mu$ | slot_configuration | | | | | |
|---|---|---|---|---|---|---|
| | 0 | | | 1 | | |
| | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

Figure B: Table of number of OFDM symbols per slot $N_{symb}^{slot,\mu}$ for subcarrier spacing configuration $\mu$ and extended cyclic prefix

| $\mu$ | slot_configuration | | | | | |
|---|---|---|---|---|---|---|
| | 0 | | | 1 | | |
| | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 2 | 12 | 40 | 4 | 6 | 80 | 8 |

FIG. 2

| PUCCH format | Length in OFDM symbols $N^{PUCCH}_{symb}$ | $N_{UCI0}$ |
|---|---|---|
| 0 | 1 - 2 | ≤ 2 |
| 1 | 4 - 14 | ≤ 2 |
| 2 | 1 - 2 | > 2 |
| 3 | 4 - 14 | > 2 |
| 4 | 4 - 14 | > 2 |

FIG. 4

USER EQUIPMENT, BASE STATION DEVICE, AND COMMUNICATION METHOD FOR DCI-BASED RESOURCE ALLOCATION

TECHNICAL FIELD

The present invention relates to a terminal apparatus, a base station apparatus, and a communication method.

This application claims priority based on JP 2018-091541 filed on May 10, 2018, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas are deployed in a cell structure, with each of the multiple areas being covered by a base station apparatus. A single base station apparatus may manage multiple serving cells.

3GPP has been studying a next generation standard (New Radio (NR)) (NPL 1) to make a proposal for International Mobile Telecommunication (IMT)-2020, a standard for a next-generation mobile communication system, standardized by the International Telecommunication Union (ITU). NR is required to satisfy requirements for three scenarios including enhanced Mobile BroadBand (eMBB), massive Machine Type Communication (mMTC), and Ultra Reliable and Low Latency Communication (URLLC) in a single technology framework.

In 3GPP, channel numbers in the carrier frequency bands (Absolute Radio Frequency Channel Numbers (ARFCN)) are defined (NPL 2, NPL 3).

CITATION LIST

Non Patent Literature

NPL 1: "New SID proposal: Study on New Radio Access Technology", RP-160671, NTT DOCOMO Inc., 3GPP TSG RAN Meeting #71, Goteborg, Sweden, 7th to 10 Mar. 2016.

NPL 2: "3GPP TS 38.101-1 V15.1.0 (2018-03)", 6 Apr. 2018.

NPL 3: "3GPP TS 38.101-2 V15.1.0 (2018-03)", 6 Apr. 2018.

SUMMARY OF INVENTION

Technical Problem

An aspect of the present invention provides a terminal apparatus capable of efficiently performing communication, a communication method used for the terminal apparatus, a base station apparatus capable of efficiently performing communication, and a communication method used for the base station apparatus.

Solution to Problem (1) A first aspect of the present invention is a terminal apparatus for communicating with a base station apparatus in a serving cell, the terminal apparatus including: a higher layer processing unit configured to configure, in the serving cell, the first set of downlink resource blocks continuous in a frequency domain and the second set, which is different from the first set, of downlink resource blocks continuous in the frequency domain; and a receiver configured to monitor a first Physical Downlink Control Channel (PDCCH) with a first Downlink Control Information (DCI) format in the first set, the first set being activated, and receive a Physical Downlink Shared Channel (PDSCH) scheduled according to the first DCI format in the first set, wherein in a case that the number of different sizes of DCI formats monitored using a Common-Radio Network Temporary Identifier (C-RNTI) in the serving cell exceeds three, a size of a first frequency domain resource allocation field included in the first DCI format is provided based on the number of the resource blocks in the second set, and the first frequency domain resource allocation field is used for scheduling the resource blocks in the first set.

(2) A second aspect of the present invention is a base station apparatus for communicating with a terminal apparatus in a serving cell, the base station apparatus including: a higher layer processing unit configured to configure, in the serving cell, a first set of downlink resource blocks continuous in a frequency domain and the second set, which is different from the first set, of downlink resource blocks continuous in the frequency domain; and a transmitter configured to transmit a first Physical Downlink Control Channel (PDCCH) with a first Downlink Control Information (DCI) format in the first set, the first set being activated, and transmit a Physical Downlink Shared Channel (PDSCH) scheduled according to the DCI format in the first set, wherein in a case that the number of sizes of DCI formats monitored using a Common-Radio Network Temporary Identifier (C-RNTI) in the serving cell exceeds three, a size of a first frequency domain resource allocation field included in the first DCI format is provided based on the number of the second sets, and the first frequency domain resource allocation field is used for scheduling the resource blocks in the first set.

(3) A third aspect of the present invention is a communication method used for a terminal apparatus for communicating with a base station apparatus in a serving cell, the communication method including the steps of: configuring, in the serving cell, the first set of downlink resource blocks continuous in a frequency domain and the second set, which is different from the first set, of downlink resource blocks continuous in the frequency domain; and monitoring a first Physical Downlink Control Channel (PDCCH) with a first Downlink Control Information (DCI) format in the first set, the first set being activated, and receiving a Physical Downlink Shared Channel (PDSCH) scheduled according to the first DCI format in the first set, wherein in a case that the number of different sizes of DCI formats monitored using a Common-Radio Network Temporary Identifier (C-RNTI) in the serving cell exceeds three, a size of a first frequency domain resource allocation field included in the first DCI format is provided based on the number of the resource blocks in the second set, and the first frequency domain resource allocation field is used for scheduling the resource blocks in the first set.

(4) A fourth aspect of the present invention is a communication method used for a base station apparatus for communicating with a terminal apparatus in a serving cell, the communication method including the steps of: configuring, in the serving cell, the first set of downlink resource blocks continuous in a frequency domain and the second set, which is different from the first set, of downlink resource blocks continuous in the frequency domain; and transmitting a first Physical Downlink Control Channel (PDCCH) with a first Downlink Control Information (DCI) format in the first set, the first set being activated, and transmitting a Physical Downlink Shared Channel (PDSCH) scheduled according to the first DCI format in the first set, wherein in a case that the number of sizes of DCI formats monitored using a Common-Radio Network Temporary Identifier (C-RNTI) in the serving cell exceeds three, a size of a first frequency domain resource allocation field included in the first DCI format is provided based on the number of the resource blocks in the second sets, and the first frequency domain resource allocation field is used for scheduling the resource blocks in the first set.

Advantageous Effects of Invention

According to one aspect of the present invention, the terminal apparatus can efficiently perform communication. The base station apparatus can efficiently perform communication.

BRIEF DESCRIPTION OF DRAWINGS

FIG. 2 is an example illustrating a relationship between $N^{slot}_{symb}$, a subcarrier spacing configuration μ, a slot configuration, and a CP configuration according to an aspect of the present embodiment.

FIG. 4 is a diagram illustrating an example of a relationship between a PUCCH format and a PUCCH format length $N^{PUCCH}_{symb}$ and $N_{UCI0}$ according to an aspect of the present embodiment.

DESCRIPTION OF EMBODIMENTS

Embodiments of the present invention will be described below.

A parameter or information indicating one or multiple values may mean that the parameter or information at least includes a parameter or information indicating the one or multiple values. A parameter of a higher layer may be a single higher layer parameter. A parameter of a higher layer may be an Information Element (IE) including multiple parameters.

Figure 1:
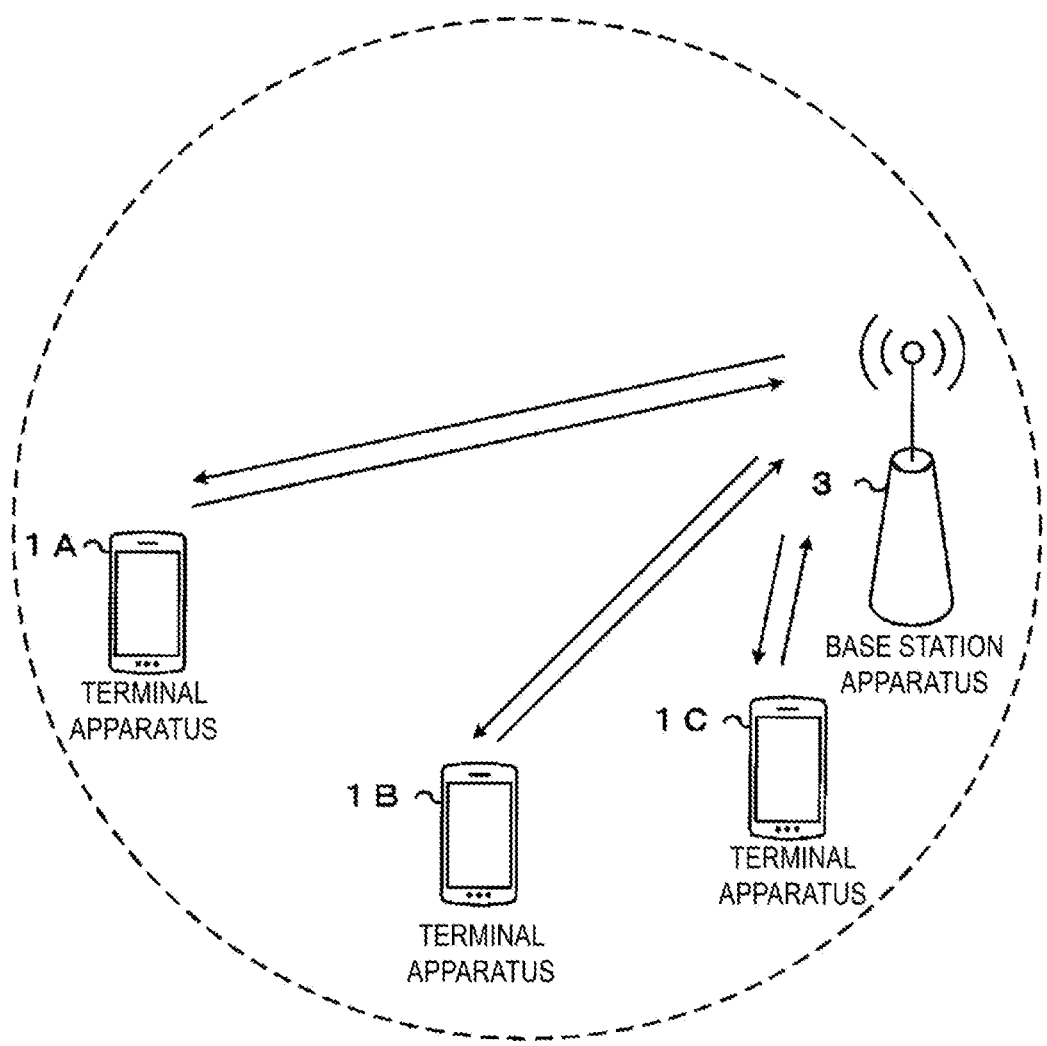
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system includes terminal apparatuses 1A to 1C and a base station apparatus 3. Hereinafter, the terminal apparatuses 1A to 1C are each also referred to as a terminal apparatus 1.

Hereinafter, a frame structure will be described.

In the radio communication system according to an aspect of the present embodiment, at least Orthogonal Frequency Division Multiplexing (OFDM) is used. The OFDM symbol is a unit of the time domain of the OFDM. The OFDM symbol includes at least one or multiple subcarriers. The OFDM symbol is converted into a time-continuous signal in generation of a baseband signal.

With respect to SubCarrier Spacing (SCS), subcarrier spacing $\Delta f = 2^\mu * 15$ kHz may be given. For example, the subcarrier spacing configuration μ may be configured to either 0, 1, 2, 3, 4, and/or 5. For a certain BandWidth Part (BWP), the subcarrier spacing configuration μ may be given as a parameter of a higher layer. The BWP is also referred to a Carrier Bandwidth Part (CBP).

In the radio communication system according to an aspect of the present embodiment, a time unit $T_c$ is used for representing a length of the time domain. The time unit $T_c$ may be given as $T_c = 1/(\Delta f_{max} * N_f)$. $\Delta f_{max}$ may be the maximum value of the subcarrier spacing supported by the radio communication system according to an aspect of the present embodiment. $\Delta f_{max}$ may be $\Delta f_{max} = 480$ kHz. $N_f$ may be $N_f = 4096$. A constant κ may be $\kappa = \Delta f_{max} * N_f / (\Delta f_{ref} N_{f,ref}) = 64$. $\Delta f_{ref}$ may be 15 kHz. $N_{f,\ ref}$ may be 2048.

The constant κ may be a value indicating a relationship between reference subcarrier spacing and $T_c$. The constant κ may be used for a length of a subframe. The number of slots included in the subframe may be given at least based on the constant κ. $\Delta f_{ref}$ is the reference subcarrier spacing, and $N_{f,\ ref}$ is a value corresponding to the reference subcarrier spacing.

Transmission in the downlink and/or transmission in the uplink is configured with frames each having 10 ms. A frame is configured to include 10 subframes. A length of the subframe is 1 ms. The length of the frame may be given regardless of the subcarrier spacing Δf. That is, the frame configuration may be given regardless of μ. The length of the subframe may be given regardless of the subcarrier spacing Δf. That is, the subframe configuration may be given regardless of μ.

For a certain subcarrier spacing configuration μ, the number and indices of slots included in a subframe may be given. For example, a first slot number $n^\mu_s$ may be given in ascending order ranging from 0 to $N^{subframe,\ \mu}_{slot} - 1$ in a subframe. For the subcarrier spacing configuration μ, the number and indices of slots included in a frame may be given. For example, a second slot number $n^\mu_{s,f}$ may be given in ascending order ranging from 0 to $N^{frame,\ \mu}_{slot} - 1$ within a frame. $N^{slot}_{symb}$ continuous OFDM symbols may be included in one slot. $N^{slot}_{symb}$ may be given at least based on part or all of a slot configuration and/or a Cyclic Prefix (CP) configuration. The slot configuration may be given by a higher layer parameter slot_configuration. The CP configuration may be given at least based on a higher layer parameter. The CP configuration may be given based on at least the dedicated RRC signaling. The first slot number and the second slot number are also referred to as slot numbers (slot indexes).

FIG. 2 is an example illustrating a relationship between $N^{slot}_{symb}$, a subcarrier spacing configuration μ, a slot configuration, and a CP configuration according to an aspect of the present embodiment. In FIG. 2A, in a case that the slot configuration is 0, the subcarrier spacing configuration μ is 2, and the CP configuration is a normal cyclic prefix (normal CP), $N^{slot}_{symb}=14$, $N^{frame,\mu}_{slot}=40$, and $N^{subframe,\mu}_{symb}=4$. FIG. 2B, in a case that the slot configuration is 0, the subcarrier spacing configuration μ is 2, and the CP configuration is an extended cyclic prefix (extended CP), $N^{slot}_{symb}=12$, $N^{frame,\mu}_{slot}=40$, and $N^{subframe,\mu}_{slot}=4$. The $N^{slot}_{symb}$ in the slot configuration 0 may correspond to twice the number of the $N^{slot}_{symb}$ in the slot configuration 1.

Physical resources will be described below.

An antenna port is defined in such a manner that a channel on which a symbols on one antenna port is conveyed can be inferred from a channel on which another symbol on the same antenna port is conveyed. In a case that a large scale property of the channel on which the symbol on one antenna port is conveyed can be inferred from the channel on which the symbol on another antenna port is conveyed, the two antenna ports are said to be Quasi Co-Located (QCL). The large scale property may include at least a long term performance of a channel. The large scale properties may include at least some or all of delay spread, Doppler spread, Doppler shift, average gain, average delay, and beam parameters (spatial Rx parameters). A first antenna port and a second antenna port being QCL with respect to a beam parameter may mean that a reception beam assumed by the reception side for the first antenna port may be the same as a reception beam assumed by the reception side for the second antenna port. The first antenna port and the second antenna port being QCL with respect to a beam parameter may mean that a transmission beam assumed by the reception side for the first antenna port may be the same as a transmission beam assumed by the reception side for the second antenna port. In a case that a large scale property of a channel on which a symbol on one antenna port is conveyed is inferred from a channel on which a symbol on another antenna port is conveyed, the terminal apparatus 1 may assume the two antenna ports to be QCL. Two antenna ports being QCL may mean that the two antenna ports are assumed to be QCL.

For the subcarrier spacing configuration and a set of carriers, a resource grid including $N^{\mu}_{RB,x}N^{RB}_{sc}$ subcarriers and $N^{(\mu)}_{symb}N^{subframe,\mu}_{symb}$ OFDM symbols is given. $N^{\mu}_{RB,x}$ may indicate the number of resource blocks given for the subcarrier spacing configuration μ for a carrier x. $N^{\mu}_{RB,x}$ may be the maximum number of resource blocks given for the subcarrier spacing configuration μ for a carrier x. The carrier x indicates either a downlink carrier or an uplink carrier. In other words, x is "DL" or "UL". $N^{\mu}_{RB}$ is a designation including $N^{\mu}_{RB,DL}$ and/or $N^{\mu}_{RB,UL}$. $N^{RB}_{sc}$ may indicate the number of subcarriers included in one resource block. At least one resource grid may be given for each antenna port p and/or for each subcarrier spacing configuration μ and/or for each Transmission direction configuration. The transmission direction includes at least DownLink (DL) and UpLink (UL). Hereinafter, a set of parameters including at least some or all of the antenna port p, the subcarrier spacing configuration μ, and the transmission direction configuration is also referred to as a first radio parameter set. That is, one resource grid may be given for each first radio parameter set.

A carrier included in a serving cell in the downlink is referred to as a downlink carrier (or a downlink component carrier). A carrier included in a serving cell in the uplink is referred to as an uplink carrier (uplink component carrier). A downlink component carrier and an uplink component carrier are collectively referred to as a component carrier (or carrier).

Each element in the resource grid given for each first radio parameter set is referred to as a resource element. The resource element is identified by an index $k_{sc}$ of the frequency domain and an index $l_{sym}$ of the time domain. For a certain first radio parameter set, the resource element is identified by an index $k_{sc}$ of the frequency domain and an index $l_{sym}$ of the time domain. The resource element identified by the index $k_{sc}$ of the frequency domain and the index $l_{sym}$ of the time domain is also referred to as a resource element ($k_{sc}$, $l_{sym}$). The index $k_{sc}$ of the frequency domain indicates any value from 0 to $N^{\mu}_{RB}N^{RB}_{sc}-1$. $N^{\mu}_{RB}$ may be the number of resource blocks given for the subcarrier spacing configuration μ. $N^{RB}_{sc}$ is the number of subcarriers included in a resource block, and $N^{RB}_{sc}=12$. The index $k_{sc}$ of the frequency domain may correspond to a subcarrier index $k_{sc}$. The index $l_{sym}$ of the time domain may correspond to an OFDM symbol index $l_{sym}$.

Figure 3:
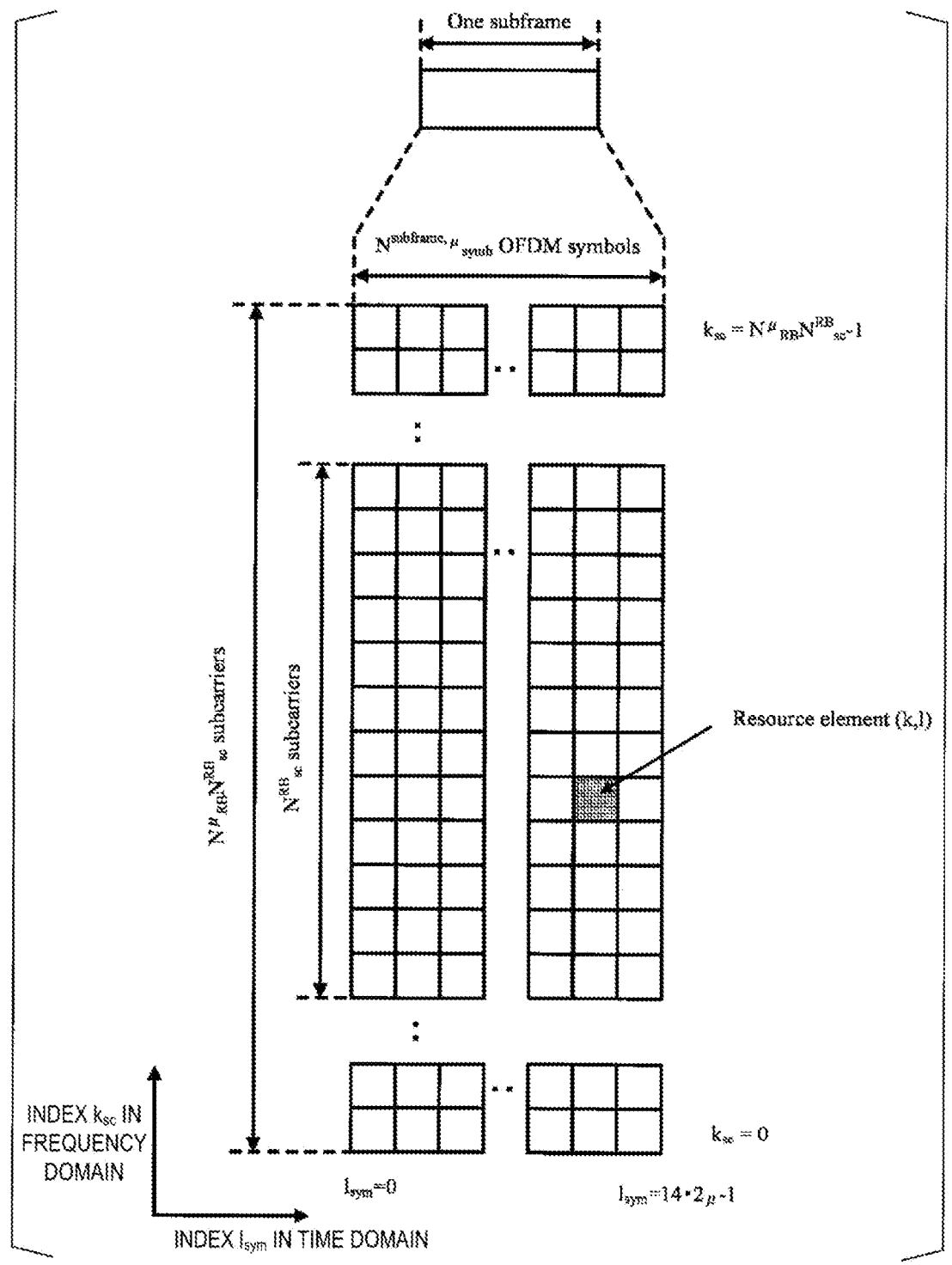
FIG. 3 is a schematic diagram illustrating an example of a resource grid in a subframe according to an aspect of the present embodiment.

FIG. 3 is a schematic diagram illustrating an example of a resource grid in a subframe according to an aspect of the present embodiment. In the resource grid of FIG. 3, the horizontal axis is the index $l_{sym}$ of the time domain, and the vertical axis is the index $k_{sc}$ of the frequency domain. In one subframe, the frequency domain of the resource grid includes $N^{\mu}_{RB}N^{RB}_{sc}$ subcarriers. In one subframe, the time domain of the resource grid may include 14*2μ OFDM symbols. One resource block includes $N^{RB}_{sc}$ subcarriers. The time domain of the resource block may correspond to one OFDM symbol. The time domain of the resource block may correspond to 14 OFDM symbols. The time domain of the resource block may correspond to one or multiple slots. The time domain of the resource block may correspond to one subframe.

The terminal apparatus 1 may receive indication to perform transmission and/or reception by using only a subset of the resource grid. The subset of the resource grid is also referred to as a BWP, and the BWP may be given based on at least some or all of a higher layer parameter and/or DCI. The BWP is also referred to as a bandwidth part (BP). That is, the terminal apparatus 1 may not receive indication to perform transmission and/or reception by using all sets of resource grids. In other words, the terminal apparatus 1 may receive indication to perform transmission and/or reception by using some frequency resources within the resource grid. One BWP may include multiple resource blocks in the frequency domain. One BWP may include multiple continuous resource blocks in the frequency domain. A BWP is also referred to as a Band Width Part (BWP). A BWP configured for a downlink carrier is also referred to as a downlink BWP. A BWP configured for an uplink carrier is also referred to as an uplink BWP.

One or multiple downlink BWPs may be configured for the terminal apparatus 1. The terminal apparatus 1 may attempt to receive a physical channel (for example, a PDCCH, a PDSCH, an SS/PBCH, or the like) in one downlink BWP of one or multiple downlink BWPs. The one downlink BWP is also referred to as an activated downlink BWP.

One or multiple uplink BWPs may be configured for the terminal apparatus 1. The terminal apparatus 1 may attempt to transmit a physical channel (for example, a PUCCH, a PUSCH, a PRACH, or the like) in one uplink BWP of one or multiple uplink BWPs. The one uplink BWP is also referred to as an activated uplink BWP.

A set of downlink BWPs may be configured for each serving cell. The set of downlink BWPs may include one or multiple downlink BWPs. A set of uplink BWPs may be configured for each serving cell. The set of uplink BWPs may include one or multiple uplink BWPs.

A higher layer parameter is a parameter included in higher layer signaling. The higher layer signaling may be a Radio Resource Control (RRC) signaling or a Medium Access Control (MAC) Control Element (CE). Here, the higher layer signaling may be RRC layer signaling or MAC layer signaling.

The higher layer signaling may be common RRC signaling. The common RRC signaling may include at least some or all of the following features C1 to C3.

Feature C1) Mapped to the BCCH logical channel or to the CCCH logical channel
Feature C2) Including at least radioResourceConfigCommon information element
Feature C3) Mapped to the PBCH The radioResourceConfigCommon information element may include information indicating a configuration commonly used in a serving cell. The configuration commonly used in the serving cell may include at least a PRACH configuration. The PRACH configuration may indicate at least one or multiple random access preamble indices. The PRACH configuration may indicate at least a time/frequency resource of a PRACH.

The higher layer signaling may be dedicated RRC signaling. The dedicated RRC signaling may include at least some or all of the following features D1 and D2.

Feature D1) Mapped to the DCCH logical channel
Feature D2) Including at least radioResourceConfigDedicated information element The radioResourceConfigDedicated information element may include at least information indicating a configuration specific to the terminal apparatus 1. The radioResourceConfigDedicated information element may include at least information indicating a BWP configuration. The BWP configuration may indicate at least the frequency resource of the BWP.

For example, MIB, first system information, and second system information may be included in the common RRC signaling. A higher layer message that is mapped to a DCCH logical channel and includes at least radioResourceConfig-Common may be included in the common RRC signaling. A higher layer message that is mapped to a DCCH logical channel and does not include a radioResourceConfigCommon information element may be included in the dedicated RRC signaling. A higher layer message that is mapped to a DCCH logical channel and includes at least a radioResourceConfigDedicated information element may be included in the dedicated RRC signaling.

The first system information may indicate at least a time index of a Synchronization Signal (SS) block. The SS block is also referred to as an SS/PBCH block. The SS/PBCH block is also referred to as an SS/PBCH. The first system information may include at least information of a PRACH resource. The first system information may include at least information on a configuration of initial connection. The second system information may be system information other than the first system information.

The radioResourceConfigDedicated information element may include at least information of the PRACH resource. The radioResourceConfigDedicated information element may include at least information on the configuration of initial connection.

A physical channel and a physical signal according to various aspects of the present embodiment will be described below.

An uplink physical channel may correspond to a set of resource elements that conveys information generated in a higher layer. The uplink physical channel is a physical channel used in an uplink carrier. In the radio communication system according to an aspect of the present embodiment, at least some or all of the uplink physical channels described below are used.

Physical Uplink Control CHannel (PUCCH)
Physical Uplink Shared CHannel (PUSCH)
Physical Random Access CHannel (PRACH)

The PUCCH may be used to transmit Uplink Control Information (UCI). The uplink control information includes some or all of Channel State Information (CSI); a Scheduling Request (SR); and a Hybrid Automatic Repeat request ACKnowledgement (HARQ-ACK) corresponding to a Transport Block (TB, a Medium Access Control Protocol Data Unit (MAC PDU), a DownLink-Shared Channel (DL-SCH), or a Physical Downlink Shared Channel (PDSCH)).

The HARQ-ACK may include at least a HARQ-ACK bit corresponding to at least one transport block. The HARQ-ACK bit may indicate an acknowledgement (ACK) or a negative-acknowledgement (NACK) corresponding to one or multiple transport blocks. The HARQ-ACK may include at least a HARQ-ACK codebook including one or multiple HARQ-ACK bits. The HARQ-ACK bit corresponding to one or multiple transport blocks may mean that the HARQ-ACK bit corresponds to a PDSCH including the one or multiple transport blocks.

The HARQ-ACK bit may indicate an ACK or a NACK corresponding to one Code Block Groups (CBGs) included in a transport block. The HARQ-ACK is also referred to as HARQ feedback, HARQ information, or HARQ control information.

The Scheduling Request (SR) may be used at least to request a resource of the PUSCH for the initial transmission. The scheduling request bit may be used to indicate either positive SR or negative SR. The scheduling request bit indicating a positive SR is also referred to as "a positive SR is transmitted". The positive SR may indicate that a resource of the PUSCH for the initial transmission is requested by the terminal apparatus 1. The positive SR may indicate that a scheduling request is triggered by a higher layer. The positive SR may be transmitted in a case that it is indicated by a higher layer to transmit a scheduling request. The scheduling request bit indicating a negative SR is also referred to as "a negative SR is transmitted". The negative SR may indicate that a resource of the PUSCH for the initial transmission is not requested by the terminal apparatus 1. The negative SR may indicate that a scheduling request is not triggered by a higher layer. The negative SR may be transmitted in a case that it is not indicated by a higher layer to transmit a scheduling request.

The scheduling request bit may be used to indicate either a positive SR or a negative SR for either one or multiple SR configurations. Each of the one or multiple SR configurations may correspond to one or multiple logical channels. A positive SR for a given SR configuration may be a positive SR for any or all of the one or multiple logical channels corresponding to the given SR configuration. The negative SR may not correspond to a particular SR configuration. A negative SR being indicated may be a negative SR being indicated for all SR configurations.

The SR configuration may be a Scheduling Request ID.

The channel state information may include at least some or all of a Channel Quality Indicator (CQI), a Precoder Matrix Indicator (PMI), and a Rank Indicator (RI). The CQI is an indicator associated with a channel quality (for example, propagation strength), and the PMI is an indicator indicating a precoder. The RI is an indicator indicating a transmission rank (or the number of transmission layers).

The PUCCH supports PUCCH format (PUCCH format 0 to PUCCH format 4). The PUCCH format may be mapped to and transmitted to the PUCCH. The PUCCH format may be transmitted on the PUCCH. The transmission of the PUCCH format may be the transmission of the PUCCH.

FIG. 4 is a diagram illustrating an example of a relationship between a PUCCH format and a PUCCH format length $N^{PUCCH}_{symb}$ and $N_{UCI0}$ according to an aspect of the present embodiment. The length $N^{PUCCH}_{symb}$ of PUCCH format 0 is 1 or 2 OFDM symbols, and the value of $N_{UCI0}$ associated with PUCCH format 0 is 2 or less. The length $N^{PUCCH}_{symb}$ of PUCCH format 1 is 4 to 14 OFDM symbols, and the value of $N_{UCI0}$ associated with PUCCH format 1 is 2 or less. The length $N^{PUCCH}_{symb}$ of PUCCH format 2 is 1 or 2 OFDM symbols, and the value of $N_{UCI0}$ associated with PUCCH format 2 is greater than 2. The length $N^{PUCCH}_{symb}$ of PUCCH format 3 is 4 to 14 OFDM symbols, and the value of $N_{UCI0}$ associated with PUCCH format 3 is greater than 2. The length $N^{PUCCH}_{symb}$ of PUCCH format 4 is 4 to 14 OFDM symbols, and the value of $N_{UCI0}$ associated with PUCCH format 4 is greater than 2. The $N_{UCI0}$ may be given based at least on the $O_{ACK}$ transmitted in the PUCCH format. The $N_{UCI0}$ may be given regardless of the number $O_{SR}$ of scheduling request bits.

The PUSCH is used at least to transmit a transport block (TB, MAC PDU, UL-SCH, and PUSCH). The PUSCH may be used to transmit at least some or all of the transport block, the HARQ-ACK, the channel state information, and the scheduling request. The PUSCH is used at least to transmit a random access message 3.

The PRACH is used at least to transmit a random access preamble (random access message 1). The PRACH may be at least used to indicate some or all of an initial connection establishment procedure, a handover procedure, a connection re-establishment procedure, synchronization (timing adjustment) for the transmission of the PUSCH, and a resource request for the PUSCH. The random access preamble may be used to notify the base station apparatus 3 of an index (random access preamble index) given by a higher layer of the terminal apparatus 1.

The random access preamble may be given by cyclic-shifting a Zadoff-Chu sequence corresponding to a physical root sequence index u. The Zadoff-Chu sequence may be generated based on the physical root sequence index u. In one serving cell, multiple random access preambles may be defined. A random access preamble may be identified at least based on an index of the random access preamble. A different random access preamble corresponding to a different index of the random access preamble may correspond to a different combination of the physical root sequence index u and the cyclic shift. The physical root sequence index u and the cyclic shift may be given at least based on information included in system information. The physical root sequence index u may be an index for identifying a sequence included in the random access preamble. The random access preamble may be identified at least based on the physical root sequence index u.

In FIG. 1, the following uplink physical signals are used for uplink radio communication. The uplink physical signals may not be used to transmit information output from a higher layer, but is used by a physical layer.

UpLink Demodulation Reference Signal (UL DMRS)
Sounding Reference Signal (SRS)
UpLink Phase Tracking Reference Signal (UL PTRS)

The UL DMRS is associated with transmission of a PUSCH and/or a PUCCH. The UL DMRS is multiplexed with the PUSCH or the PUCCH. The base station apparatus 3 may use the UL DMRS in order to perform channel compensation of the PUSCH or the PUCCH. Transmission of both a PUSCH and a UL DMRS associated with the PUSCH will be hereinafter referred to simply as transmission of a PUSCH. Transmission of both a PUCCH and a UL DMRS associated with the PUCCH will be hereinafter referred to simply as transmission of a PUCCH. The UL DMRS associated with the PUSCH is also referred to as a UL DMRS for a PUSCH. The UL DMRS associated with the PUCCH is also referred to as a UL DMRS for a PUCCH.

The SRS may not be associated with transmission of the PUSCH or the PUCCH. The base station apparatus 3 may use the SRS for measuring a channel state. The SRS may be transmitted at the end of a subframe in an uplink slot or in a prescribed number of OFDM symbols from the end.

The UL PTRS may be a reference signal that is at least used for phase tracking. The UL PTRS may be associated with a UL DMRS group including at least an antenna port used for one or multiple UL DMRSs. The association of the UL PTRS with UL DMRS group may mean that the antenna port for the UL PTRS and some or all of the antenna ports included in the UL DMRS group are at least QCL. The UL DMRS group may be identified at least based on the antenna port of the lowest index for the UL DMRS included in the UL DMRS group. The UL PTRS may be mapped to the antenna port of the lowest index in one or multiple antenna ports to which one codeword is mapped. The UL PTRS may be mapped to a first layer in a case that one codeword is at least mapped to the first layer and a second layer. The UL PTRS may not be mapped to the second layer. The index of the antenna port to which the UL PTRS is mapped may be given based on at least the downlink control information.

In FIG. 1, the following downlink physical channels are used for downlink radio communication from the base station apparatus 3 to the terminal apparatus 1. The downlink physical channels are used by the physical layer for transmission of information output from a higher layer.

Physical Broadcast Channel (PBCH)
Physical Downlink Control Channel (PDCCH)
Physical Downlink Shared Channel (PDSCH)

The PBCH is used at least to transmit a Master Information Block (MIB, BCH, or Broadcast Channel). The PBCH may be transmitted at a prescribed transmission interval. The PBCH may be transmitted at an interval of 80 ms. The PBCH may be transmitted at an interval of 160 ms. Contents of information included in the PBCH may be updated at every 80 ms. Some or all of contents of information included in the PBCH may be updated at every 160 ms. The PBCH may include 288 subcarriers. The PBCH may include 2, 3, or 4 OFDM symbols. The MIB may include information on an identifier (index) of a synchronization signal. The MIB may include information indicating at least some of a number of a slot, a number of a subframe, and/or a number of a radio frame in which a PBCH is transmitted.

The PDCCH is used at least to transmit Downlink Control Information (DCI). The PDCCH may be transmitted including at least the downlink control information. The PDCCH may include the downlink control information. The downlink control information is also referred to as a DCI format. The downlink control information may include at least either a downlink grant or an uplink grant. The DCI format used for scheduling of the PDSCH is also referred to as a downlink DCI format. The DCI format used for scheduling of the PUSCH is also referred to as an uplink DCI format. The downlink grant is also referred to as downlink assignment or downlink allocation. The uplink DCI format includes at least one or both of the first uplink DCI format and the second uplink DCI format.

The first uplink DCI format is configured to include at least some or all of 1A to 1F.

1A) DCI format identification field (Identifier for DCI formats field)
1B) Frequency domain resource allocation field (Frequency domain resource assignment field)
1C) Time domain resource allocation field (Time domain resource assignment field)
1D) Frequency hopping flag field
1E) MCS field (Modulation and Coding Scheme field)
1F) First CSI request field The DCI format identification field may be used at least to indicate whether the DCI format including the DCI format identification field corresponds to any one of one or multiple DCI formats. The one or multiple DCI formats may be given based on at least some or all of the downlink DCI format, the first uplink DCI format, and/or the second DCI format. The one or multiple DCI formats may include at least some or all of the downlink DCI format, the first uplink DCI format, and/or the second DCI format.

The frequency domain resource allocation field may be used at least to indicate the allocation of frequency resources for the PUSCH scheduled by the DCI format including the frequency domain resource allocation field.

The time domain resource allocation field may be at least used to indicate the allocation of time resources for the PUSCH scheduled by the DCI format including the time domain resource allocation field.

The frequency hopping flag field may be used at least to indicate whether or not the frequency hopping is applied to the PUSCH scheduled by the DCI format including the frequency hopping flag field.

The MCS field may be at least used to indicate some or all of the modulation scheme and/or target coding rate for the PUSCH scheduled by the DCI format including the MCS field. The target coding rate may be a target coding rate for a transport block of the PUSCH. The size of the transport block (Transport Block Size (TBS)) may be given based at least on the target coding rate.

The first CSI request field is at least used to indicate the CSI report. The size of the first CSI request field may be a prescribed value. The size of the first CSI request field may be 0, 1, 2, or 3.

The second uplink DCI format is configured to include at least some or all of 2A to 2G.

2A) DCI format identification field
2B) Frequency domain resource allocation field
2C) Time domain resource allocation field
2D) Frequency hopping flag field
2E) MCS field
2F) Second CSI request field
2G) BWP field The BWP field may be used to indicate the uplink BWP to which the PUSCH scheduled by the second uplink DCI format is mapped.

The second CSI request field is at least used to indicate the CSI report. The size of the second CSI request field may be given based at least on the higher layer parameter ReportTriggerSize.

The downlink DCI format includes one or both of the first downlink DCI format and the second downlink DCI format.

The first downlink DCI format is configured to include at least some or all of 3A to 3H.

3A) DCI format identification field (Identifier for DCI formats field)
3B) Frequency domain resource allocation field (Frequency domain resource assignment field)
3C) Time domain resource allocation field (Time domain resource assignment field)
3D) Frequency hopping flag field
3E) MCS field (Modulation and Coding Scheme field)
3F) First CSI request field
3G) Timing Indication Field from PDSCH to HARQ feedback (PDSCH to HARQ feedback timing indicator field)
3H) PUCCH resource indication field (PUCCH resource indicator field)

The timing indication field from the PDSCH to the HARQ feedback may be a field indicating a timing K1. In a case that the index of the slot including the last OFDM symbol of the PDSCH is the slot n, the index of the slot including the PUCCH or PUSCH including at least the HARQ-ACK corresponding to the transport block included in the PDSCH may be n+K1. In a case that the index of the slot including the last OFDM symbol of the PDSCH is slot n, the index of the slot including the OFDM symbol at the beginning of the PUCCH or the OFDM symbol at the beginning of the PUSCH including at least the HARQ-ACK corresponding to the transport block included in the PDSCH may be n+K1.

The PUCCH resource indication field may be a field indicating an index of one or multiple PUCCH resources included in the PUCCH resource set.

The second downlink DCI format is configured to include at least some or all of 4A to 4J.

4A) DCI format identification field (Identifier for DCI formats field)
4B) Frequency domain resource allocation field (Frequency domain resource assignment field)
4C) Time domain resource allocation field (Time domain resource assignment field)
4D) Frequency hopping flag field
4E) MCS field (Modulation and Coding Scheme field)
4F) First CSI request field
4G) Timing Indication Field from PDSCH to HARQ feedback (PDSCH to HARQ feedback timing indicator field)
4H) PUCCH resource indication field (PUCCH resource indicator field)
4J) BWP field The BWP field may be used to indicate the downlink BWP to which the PDSCH scheduled by the second downlink DCI format is mapped.

In various aspects of the present embodiment, unless otherwise specified, the number of resource blocks indicates the number of resource blocks in the frequency domain.

A downlink grant is at least used for scheduling of a single PDSCH in a single serving cell.

An uplink grant is at least used for scheduling of a single PUSCH in a single serving cell.

A single physical channel may be mapped to a single serving cell. A single physical channel may be mapped by a single BWP configured by a single carrier included in a single serving cell.

In the terminal apparatus 1, one or multiple COntrol REsource SETs (CORESETs) are configured. The terminal apparatus 1 monitors the PDCCH in one or multiple control resource sets.

The control resource set may indicate a time-frequency domain to which one or multiple PDCCHs can be mapped. The control resource set may be a region in which the terminal apparatus 1 monitors the PDCCH. The control resource set may include continuous resources (Localized resources). The control resource set may include non-continuous resources (distributed resources).

In the frequency domain, the unit of mapping the control resource set may use a resource block. In the frequency domain, for example, the unit of mapping the control resource set may be six resource blocks. In the time domain, the unit of mapping the control resource set may use an OFDM symbol. In the time domain, for example, the unit of mapping the control resource set may be one OFDM symbol.

The frequency domain of the control resource sets may be given at least based on higher layer signaling and/or downlink control information.

The time domain of the control resource sets may be given at least based on higher layer signaling and/or downlink control information.

A certain control resource set may be a Common control resource set. The common control resource set may be a control resource set configured commonly to multiple terminal apparatuses 1. The common control resource set may be given at least based on some or all of an MIB, first system information, second system information, common RRC signaling, and a cell ID. For example, the time resource and/or the frequency resource of the control resource set configured to monitor the PDCCH to be used for scheduling of the first system information may be given at least based on the MIB.

The control resource set configured in the MIB is also referred to as CORESET #0. The CORESET #0 may be a control resource set of index #0.

A certain control resource set may be a Dedicated control resource set. The dedicated control resource set may be a control resource set configured to be used exclusively for the terminal apparatus 1. The dedicated control resource set may be given at least based on dedicated RRC signaling and some or all of values of C-RNTI.

The mapping of the control resource set to a resource block may be given at least based on a higher layer parameter. The higher layer parameter may include a bitmap for a group of resource blocks (Resource Block Group (RBG)). The group of resource blocks may be given by six continuous resource blocks.

Figure 5:
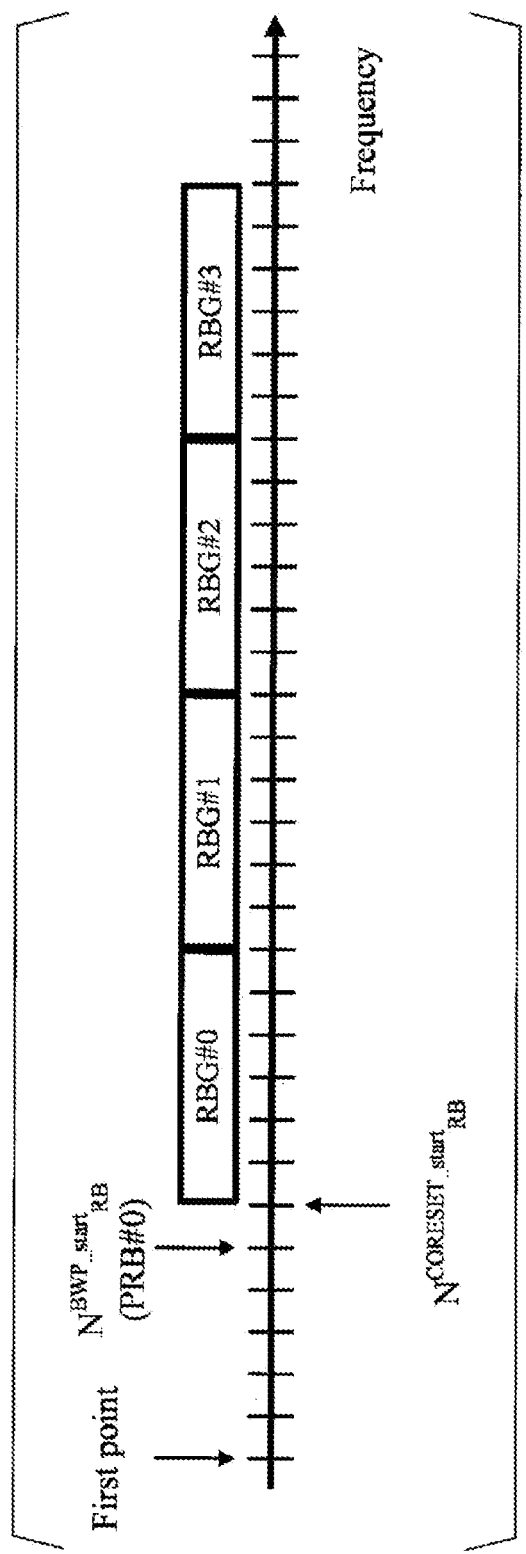
FIG. 5 is a diagram illustrating an example of mapping of resource blocks of control resource sets according to an aspect of the present embodiment.

FIG. 5 is a diagram illustrating an example of mapping of resource blocks of control resource sets according to an aspect of the present embodiment. In FIG. 5, a set of a group of resource blocks (RBG #0, RBG #1, RBG #2, RBG #3) is given, indicated by a higher layer parameter CORESET_DEDICATED that provides a mapping of a control resource set to a resource block. The index of the resource block at the beginning of one or multiple resource blocks to which a set of groups of the resource blocks are mapped is referred to as $N^{CORESET\_bitmap\_start}_{RB}$. Each of the bits of the bitmap included in the higher layer parameter CORESET_DEDICATED may correspond to a group of resource blocks. For example, in a case that the bitmap indicates '1011', the control resource set is configured by RBG #0, RBG #2, and RBG #3.

The $N^{CORESET\_bitmap\_start}_{RB}$ may indicate an index of a resource block at the beginning of multiple resource blocks included in a group of resource blocks of a minimum index (RBG #0), in sets of groups of resource blocks corresponding to a higher layer parameter that provides mapping of a control resource set to a resource block. The $N^{CORESET\_bitmap\_start}_{RB}$ may indicate an index of a resource block at the beginning of multiple resource blocks corresponding to a higher layer parameter that provides mapping of a control resource set to a resource block.

The $N^{CORESET\_start}_{RB}$ may be given by the following Equation 1.

$$N^{CORESET\_bitmap\_start}_{RB} = 6 * \text{ceil}(N^{BWP\_start}_{RB}) \quad \text{Equation 1}$$

The $N^{BWP\_start}_{RB}$ indicates an index of a resource block at the beginning of one or multiple resource blocks of the BWP.

The mapping of a control resource set other than CORESET #0 to a resource block may be given based at least on the higher layer parameter CORESET_DEDICATED.

The mapping of CORESET #0 to a resource block may be given based at least on a parameter included in the MIB included in the PBCH.

The mapping of CORESET #0 to a resource block may be given based at least on the higher layer parameter CORESET_COMMON that provides mapping of a control resource set to a resource block. The higher layer parameter CORESET_COMMON may include at least information indicating an index $N^{CORESET\_init\_bitmap\_start}_{RB}$ of a resource block at the beginning of one or multiple resource blocks to which the CORESET #0 is mapped. The higher layer parameter CORESET_COMMON may include at least information indicating a difference from a first point to $N^{CORESET\_init\_start}_{RB}$. The higher layer parameter CORESET_COMMON may include at least information indicating a channel number (Absolute Radio-Frequency Channel Number (ARFCN)) corresponding to $N^{CORESET\_init\_bitmap\_start}_{RB}$. The higher layer parameter CORESET_COMMON may include at least information indicating a channel number (Absolute Radio-Frequency Channel Number (ARFCN)) of a subcarrier at the beginning of resource blocks included in $N^{CORESET\_init\_bitmap\_start}_{RB}$.

The $N^{CORESET\_init\_bitmap\_start}_{RB}$ may indicate an index of a resource block at the beginning of multiple resource blocks included in a group of resource blocks of a minimum index (RBG #0), in sets of groups of resource blocks corresponding to a higher layer parameter that provides mapping of a control resource set to a resource block. The $N^{CORESET\_init\_bitmap\_start}_{RB}$ may indicate an index of a resource block at the beginning of multiple resource blocks corresponding to a higher layer parameter that provides mapping of a control resource set to a resource block. The first higher layer parameter indicating a subcarrier of an index at the beginning of multiple subcarriers included in the common resource block #$N^{CORESET\_init\_bitmap\_start}_{RB}$ may be included in the higher layer parameter CORESET_COMMON. The first higher layer parameter indicating a subcarrier of an index at the beginning of multiple subcarriers included in RBG #0 may be included in the higher layer parameter CORESET_COMMON. The first higher layer parameter may include a channel number.

The higher layer parameter CORESET_COMMON may include at least a bitmap for a group of resource blocks. The index $N^{CORESET\_init\_bitmap\_start}_{RB}$ of a resource block at the beginning of one or multiple resource blocks to which a set of groups of resource blocks indicated by the higher layer parameter CORESET_COMMON is mapped may be given based on at least the Equation 2.

$$N^{CORESET\_init\_bitmap\_start}_{RB} = 6*\text{ceil}(N^{BWP\_start}_{RB}) + X_{CORESET\_init} \quad \text{Equation 2}$$

$X_{CORESET\_init}$ may be given based at least on the higher layer parameter CORESET_COMMON.

$N^{CORESET\_init\_bitmap\_start}_{RB}$ may be equal to $N^{BWP\_start}_{RB}$.

The set of candidates for the PDCCH monitored by the terminal apparatus 1 may be defined from the perspective of the search space. In other words, the set of PDCCH candidates monitored by the terminal apparatus 1 may be given by the search space.

The search space may be configured to include one or multiple PDCCH candidates of one or multiple Aggregation levels. An aggregation level of a PDCCH candidate may indicate the number of CCEs constituting the PDCCH.

The terminal apparatus 1 may monitor at least one or multiple search spaces in slots in which Discontinuous reception (DRX) is not configured. The DRX may be given at least based on a higher layer parameter. The terminal apparatus 1 may monitor at least one or multiple Search space sets in a slot in which the DRX is not configured.

A search space set may be configured to include at least one or multiple search spaces. The search space set may include at least some or all of type 0 PDCCH common search space, type 1 PDCCH common search space and/or UE-specific Search Space (USS). The type 0 PDCCH common search space may be at least configured for monitoring the first downlink DCI format. The type 1 PDCCH common search space may be at least configured for monitoring the first downlink DCI format. The type 0 PDCCH common search space may not be configured for monitoring the second uplink DCI format. The type 1 PDCCH common search space may not be configured for monitoring the second uplink DCI format. The UE specific search space may be at least configured for monitoring some or all of the first downlink DCI format, the second downlink DCI format, the first uplink DCI format, and/or the second uplink DCI format.

The type 0 PDCCH common search space and the type 1 PDCCH common search space are also referred to as a Common Search Space (CSS).

Each of search space sets may be associated with a single control resource set.

Each of search space sets may be included in a single control resource set. An index of a control resource set associated with the search space set may be given to each of the search space sets.

The type 0 PDCCH common search space may be used at least for the DCI format with the Cyclic Redundancy Check (CRC) sequence scrambled by System Information-Radio Network Temporary Identifier (SI-RNTI). The configuration of the control resource set that is at least associated with the type 0 PDCCH common search space may be given based at least on the higher layer parameter RMSI-PDCCH-Config. The higher layer parameter RMSI-PDCCH-Config may be included in the MIB. The higher layer parameter RMSI-PDCCH-Config may indicate at least one or both of the number of resource blocks included in a control resource set associated with at least the type 0 PDCCH common search space, and the number of OFDM symbols included in the control resource set. The higher layer parameter RMSI-PDCCH-Config may be indicated by an information field included in the MIB.

The type 1 PDCCH Common search space may be used at least for a DCI format with a CRC sequence scrambled with a Random Access-Radio Network Temporary Identifier (RA-RNTI), a CRC sequence scrambled with a Temporary Common-Radio Network Temporary Identifier (TC-RNTI), and/or a CRC sequence scrambled with a Common-Radio Network Temporary Identifier (C-RNTI). The RA-RNTI may be given based at least on a time/frequency resource of the random access preamble transmitted by the terminal apparatus 1. The TC-RNTI may be given by the PDSCH (also referred to as a message 2 or a random access response grant) scheduled by the DCI format with the CRC sequence scrambled with the RA-RNTI. The C-RNTI may be given based at least on the PDSCH (also referred to as a message 4 or a contention resolution) scheduled by the DCI format with the CRC sequence scrambled with the TC-RNTI.

The UE-specific search space may be used at least for the DCI format with the CRC sequence scrambled with the C-RNTI.

The common control resource set may include at least one or both of the CSS and the USS. The dedicated control resource set may include at least one or both of the CSS and the USS. Whether a given search space set is the CSS or the USS may be given at least based on a higher layer parameter.

A physical resource of the search space includes a Control Channel Element (CCE) of the control channel. The CCE includes a prescribed number of Resource Element Groups (REGs). For example, the CCE may include six REGs. The REG may include one OFDM symbol in one Physical Resource Block (PRB). In other words, the REG may include 12 Resource Elements (REs). The PRB is also simply referred to as a Resource Block (RB).

The PDSCH is used at least to transmit a transport block. The PDSCH may be at least used to transmit a random access message 2 (random access response). The PDSCH may be at least used to transmit system information including parameters used for initial access.

In FIG. 1, the following downlink physical signals are used for the downlink radio communication. The downlink physical signals may not be used for transmitting information output from a higher layer, but is used by the physical layer.

Synchronization signal (SS)
DownLink DeModulation Reference Signal (DL DMRS)
Channel State Information-Reference Signal (CSI-RS)
DownLink Phase Tracking Reference Signal (DL PTRS)
Tracking Reference Signal (TRS)

The synchronization signal is used for the terminal apparatus 1 to establish synchronization in a frequency domain and/or a time domain in the downlink. The synchronization signal includes a Primary Synchronization Signal (PSS) and a Secondary Synchronization Signal (SSS).

An SS block (SS/PBCH block) is configured to include at least some or all of the PSS, the SSS, and the PBCH. Respective antenna ports of some or all of the PSS, SSS, and PBCH included in the SS block may be the same. Some or all of the PSS, SSS, and PBCH included in the SS block may be mapped to continuous OFDM symbols. Respective CP configurations of some or all of the PSS, SSS, and PBCH included in the SS block may be the same. Respective subcarrier spacing configurations μ of some or all of the PSS, SSS, and PBCH included in the SS block may be the same.

The DL DMRS is associated with transmission of the PBCH, PDCCH and/or PDSCH. The DL DMRS is multiplexed with the PBCH, PDCCH and/or PDSCH. The terminal apparatuses 1 may use the DL DMRS corresponding to the PBCH, PDCCH, or PDSCH in order to perform channel compensation of the PBCH, PDCCH or PDSCH. Hereinafter, transmission of both of the PBCH and the DL DMRS associated with the PBCH is referred to as transmission of the PBCH. Transmission of both of the PDCCH and the DL DMRS associated with the PDCCH is simply referred to as transmission of the PDCCH. Transmission of both of the PDSCH and the DL DMRS associated with the PDSCH is simply referred to as transmission of the PDSCH. The DL DMRS associated with the PBCH is also referred to as a DL DMRS for the PBCH. The DL DMRS associated with the PDSCH is also referred to as a DL DMRS for the PDSCH. The DL DMRS associated with the PDCCH is also referred to as a DL DMRS associated with the PDCCH.

The DL DMRS may be a reference signal individually configured for the terminal apparatus 1. The sequence of the DL DMRS may be given at least based on a parameter individually configured for the terminal apparatus 1. The sequence of the DL DMRS may be given at least based on a UE specific value (e.g., C-RNTI, or the like). The DL DMRS may be individually transmitted for the PDCCH and/or the PDSCH.

The CSI-RS may be a signal at least used to calculate channel state information. A pattern of the CSI-RS assumed by the terminal apparatus may be given by at least a higher layer parameter.

The PTRS may be a signal to be at least used to compensate for phase noise. A pattern of the PTRS assumed by the terminal apparatus may be given at least based on a higher layer parameter and/or DCI.

The DL PTRS may be associated with a DL DMRS group that includes at least an antenna port used for one or multiple DL DMRSs. The association of the DL PTRS with the DL DMRS group may mean that the antenna port for the DL PTRS and some or all of the antenna ports included in the DL DMRS group are at least QCL. The DL DMRS group may be identified at least based on the antenna port of the lowest index of antenna ports for the DL DMRS included in the DL DMRS group.

The TRS may be a signal to be at least used for time and/or frequency synchronization. A pattern of the TRS assumed by the terminal apparatus may be given at least based on a higher layer parameter and/or DCI.

Downlink physical channels and downlink physical signals are collectively referred to as downlink signals. Uplink physical channels and uplink physical signals are collectively referred to as uplink signals. The downlink signals and the uplink signals are collectively referred to as physical signals. The downlink signal and the uplink signal are collectively referred to as signals. The downlink physical channels and the uplink physical channels are collectively referred to as physical channels. The downlink physical signals and the uplink physical signals are collectively referred to as physical signals.

The Broadcast CHannel (BCH), the Uplink-Shared CHannel (UL-SCH) and the Downlink-Shared CHannel (DL-SCH) are transport channels. A channel used in a Medium Access Control (MAC) layer is referred to as a transport channel. A unit of the transport channel used in the MAC layer is also referred to as a transport block (TB) or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 exchange (transmit and/or receive) higher layer signaling in the higher layer. For example, the base station apparatus 3 and the terminal apparatus 1 may transmit and/or receive Radio Resource Control (RRC) signaling (Radio Resource Control (RRC) message or Radio Resource Control (RRC) information) in an RRC layer. The base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are used at least to transmit the RRC signaling and/or the MAC CE. Here, the RRC signaling transmitted from the base station apparatus 3 through the PDSCH may be signaling common to multiple terminal apparatuses 1 in a serving cell. The signaling common to the multiple terminal apparatuses 1 in the serving cell is also referred to as common RRC signaling. The RRC signaling transmitted from the base station apparatus 3 through the PDSCH may be signaling dedicated to a certain terminal apparatus 1 (also referred to as dedicated signaling or UE specific signaling). The signaling dedicated to the terminal apparatus 1 is also referred to as dedicated RRC signaling. A serving cell-specific higher layer parameter may be transmitted by using the signaling common to the multiple terminal apparatuses 1 in the serving cell or the signaling dedicated to a certain terminal apparatus 1. A UE-specific higher layer parameter may be transmitted by using the signaling dedicated to the certain terminal apparatus 1.

A Broadcast Control CHannel (BCCH), a Common Control CHannel (CCCH), and a Dedicated Control CHannel (DCCH) are logical channels. For example, the BCCH is a higher layer channel used to transmit the MIB. The Common Control CHannel (CCCH) is a higher layer channel used to transmit information common to the multiple terminal apparatuses 1. Here, the CCCH may be used for a terminal apparatus 1 that is not in an RRC connected state, for example. The Dedicated Control CHannel (DCCH) is a higher layer channel at least used to transmit control information dedicated to the terminal apparatus 1 (dedicated control information). Here, the DCCH may be used for a terminal apparatus 1 that is in an RRC connected state, for example.

The BCCH in the logical channel may be mapped to the BCH, the DL-SCH, or the UL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

A configuration example of the terminal apparatus 1 according to an aspect of the present embodiment will be described below.

Figure 6:
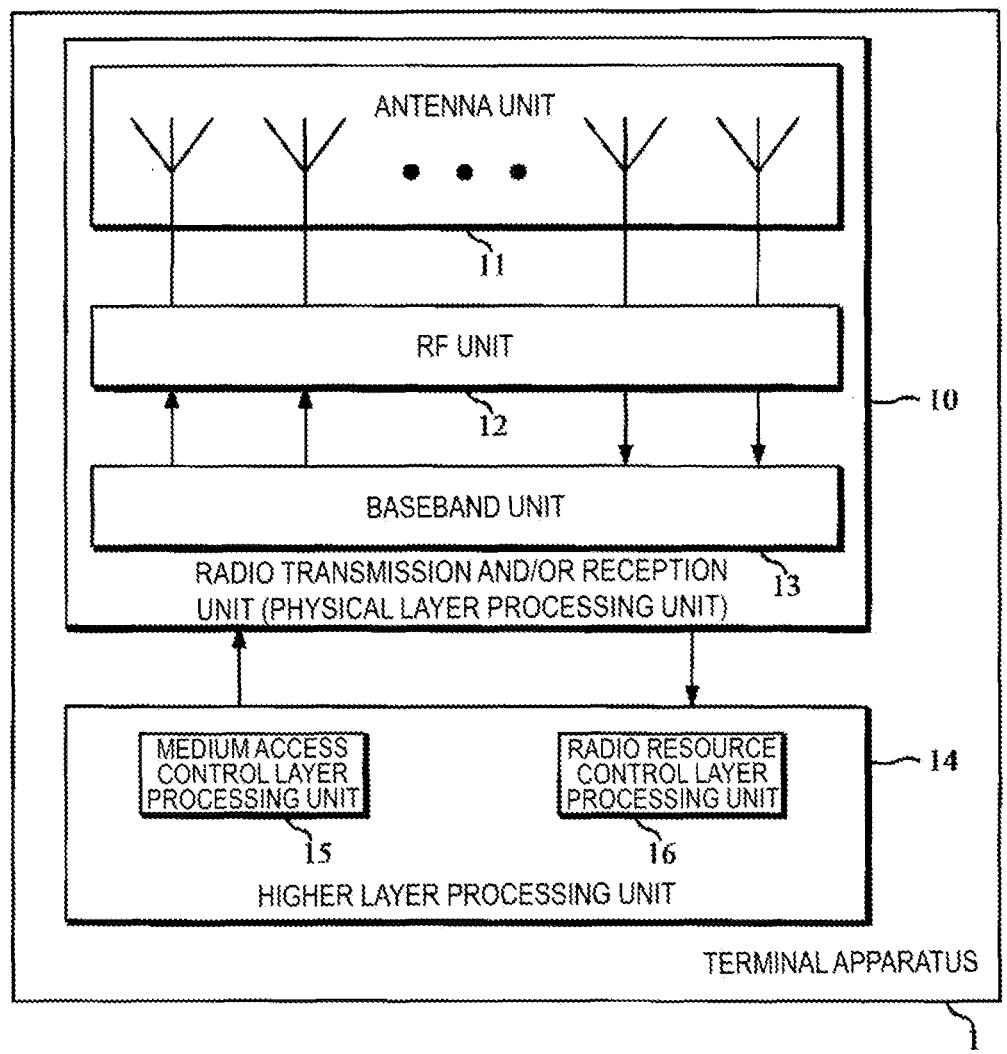
FIG. 6 is a schematic block diagram illustrating a configuration of a terminal apparatus 1 according to an aspect of the present embodiment.

FIG. 6 is a schematic block diagram illustrating a configuration of a terminal apparatus 1 according to an aspect of the present embodiment. As illustrated, the terminal apparatus 1 is configured to include a radio transmission and/or reception unit 10 and a higher layer processing unit 14. The radio transmission and/or reception unit 10 is configured to include at least some or all of an antenna unit 11, a Radio Frequency (RF) unit 12, and a baseband unit 13. The higher layer processing unit 14 is configured to include at least some or all of a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of a MAC layer, a Packet Data Convergence Protocol (PDCP) layer, a Radio Link Control (RLC) layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3. The parameters may be higher layer parameters.

The radio transmission and/or reception unit 10 performs processing of the physical layer, such as modulation, demodulation, coding, decoding, and the like. The radio transmission and/or reception unit 10 demultiplexes, demodulates, and decodes a received physical signal and outputs the decoded information to the higher layer processing unit 14. The radio transmission and/or reception unit 10 generates a physical signal by performing modulation and coding of data, and generating a baseband signal (conversion into a time continuous signal), and transmits the physical signal to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. The RF unit 12 amplifies power. The RF unit 12 may have a function of controlling transmit power. The RF unit 12 is also referred to as a transmit power control unit.

A configuration example of the base station apparatus 3 according to one aspect of the present embodiment will be described below.

Figure 7:
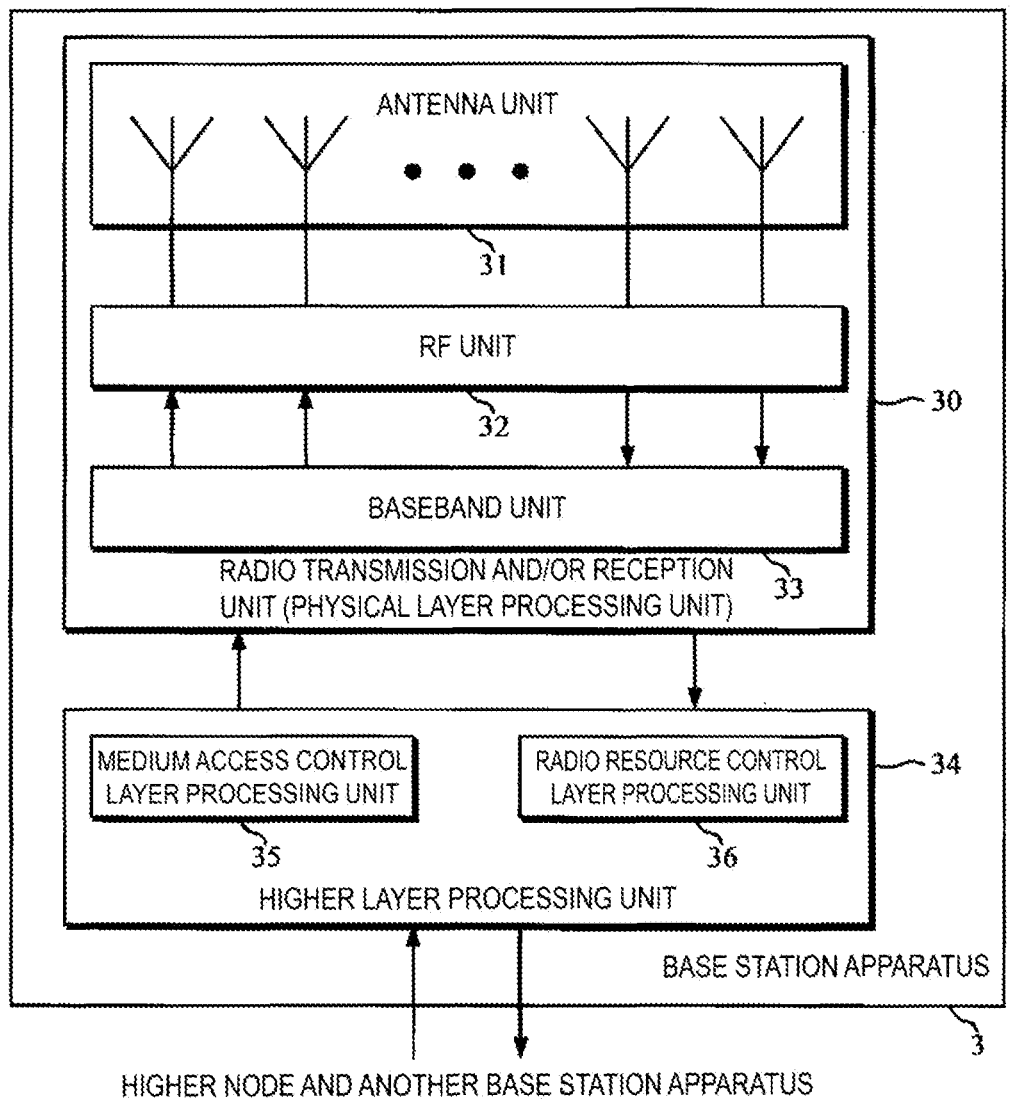
FIG. 7 is a schematic block diagram illustrating a configuration of a base station apparatus 3 according to an aspect of the present embodiment.

FIG. 7 is a schematic block diagram illustrating a configuration of a base station apparatus 3 according to an aspect of the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of a MAC layer, a PDCP layer, an RLC layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 generates, or acquires from a higher node, downlink data (transport block) allocated on a PDSCH, system information, an RRC message, a MAC CE, and the like, and outputs the data to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

A description of resource blocks will be given. The common resource block and the physical resource block are also referred to as resource blocks.

Figure 8:
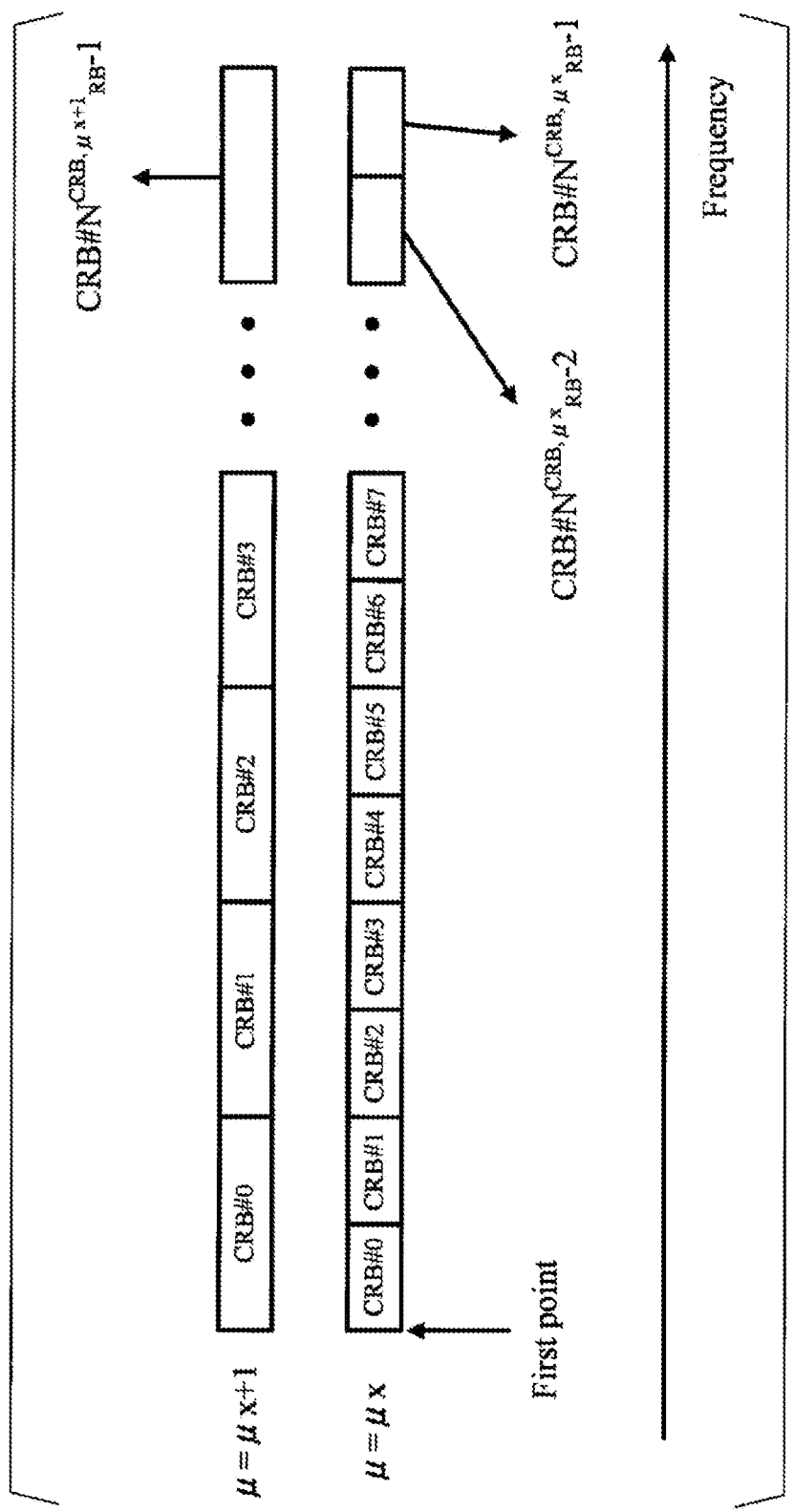
FIG. 8 is an example illustrating a Common Resource Block (CRB) set according to an aspect of the present embodiment.

FIG. 8 is an example illustrating a Common Resource Block (CRB) set according to an aspect of the present embodiment. In FIG. 8, a first point is provided on a resource grid. As illustrated in FIG. 8, the number of common resource blocks included in the set of common resource blocks for the subcarrier spacing configuration $\mu=\mu x$ is given by $N^{CRB, \mu x}_{RB}$. The set of common resource blocks for the subcarrier spacing configuration $\mu=\mu x$ includes common resource blocks from a common resource block of the index #0 (CRB #0) to a common resource block of the index #$N^{CRB, \mu x}_{RB}-1$ (CRB #$N^{CRB, \mu x}_{RB}-1$). The index of the common resource block included in the set of common resource blocks for the subcarrier spacing configuration $\mu x$ is given in a range from index #0 to index #$N^{CRB, \mu x}_{RB}-1$ in order from the lower frequency to which the common resource block is mapped. The common resource block included in the set of common resource blocks for the subcarrier spacing configuration $\mu x$ is also referred to as a common resource block for the subcarrier spacing configuration $\mu x$. A common resource block #$n^{CRB, \mu x}$ for the subcarrier spacing configuration μx indicates a common resource block for the subcarrier spacing configuration μx of the index $\#n^{CRB, \mu x}$. Possible values for $n^{CRBs, \mu x}$ are given in the range of 0 to $N^{CRB, \mu x}{}_{RB}-1$. The set of common resource blocks for the subcarrier spacing configurations μx is also referred to as a set of common resource blocks. The set of common resource blocks for the subcarrier spacing configuration μx is also referred to as a common resource block.

The frequency to which the common resource blocks $\#n^{CRB, \mu x+1}$ for the subcarrier spacing configuration μx+1 are mapped corresponds to the common resource block $\#2^*n^{CRB, \mu x+1}$ and the common resource block $\#2^*n^{CRB, \mu x+1}+1$ for the subcarrier spacing configuration μx.

The index of the subcarriers included in the set of common resource blocks for the subcarrier spacing μ is given in a range from index #0 to index $\#N^{RB}{}_{sc}*N^{CRB, \mu x}{}_{RB}-1$ in order from the lower frequency to which the subcarriers are mapped. The subcarrier at the beginning of the multiple subcarriers included in the common resource block #0 for the subcarrier spacing configuration μ=μx, and the subcarrier at the beginning of the multiple subcarriers included in the common resource block #0 for the subcarrier spacing configuration μ=μx+1 correspond to the first point. The subcarrier at the beginning of the one or multiple subcarriers may be the subcarrier having the lowest frequency among the one or multiple subcarriers.

The physical resource blocks of the downlink BWP may be given as a subset of the common resource blocks for the subcarrier spacing configuration μ. The subcarrier spacing configuration μ may be a subcarrier spacing configuration μ configured in the downlink BWP. In a case that the number of physical resource blocks in the downlink BWP is $N^{BWP, \mu}{}_{RB}$, and an index of a common resource block at the beginning of one or multiple common resource blocks included in the downlink BWP is $N^{BWP\_start, \mu}{}_{RB}$, the physical resource blocks of the downlink BWP may be configured by the common resource blocks from index $\#N^{BWP\_star, \mu}{}_{RB}$ to $\#N^{BWP\_start, \mu}{}_{RB}+N^{BWP, \mu}{}_{RB}-1$. The common resource blocks from index $\#N^{BWP\_start, \mu}{}_{RB}$ to $\#N^{BWP\_start, \mu}{}_{RB}+N^{BWP, \mu}{}_{RB}-1$ in the downlink BWP may correspond to each of the physical resource blocks from index #0 to index $\#N^{BWP, \mu}{}_{RB}-1$ in the downlink BWP. The index of the resource block at the beginning of the one or multiple resource blocks may be a resource block mapped to the lowest frequency of the one or multiple resource blocks.

Figure 9:
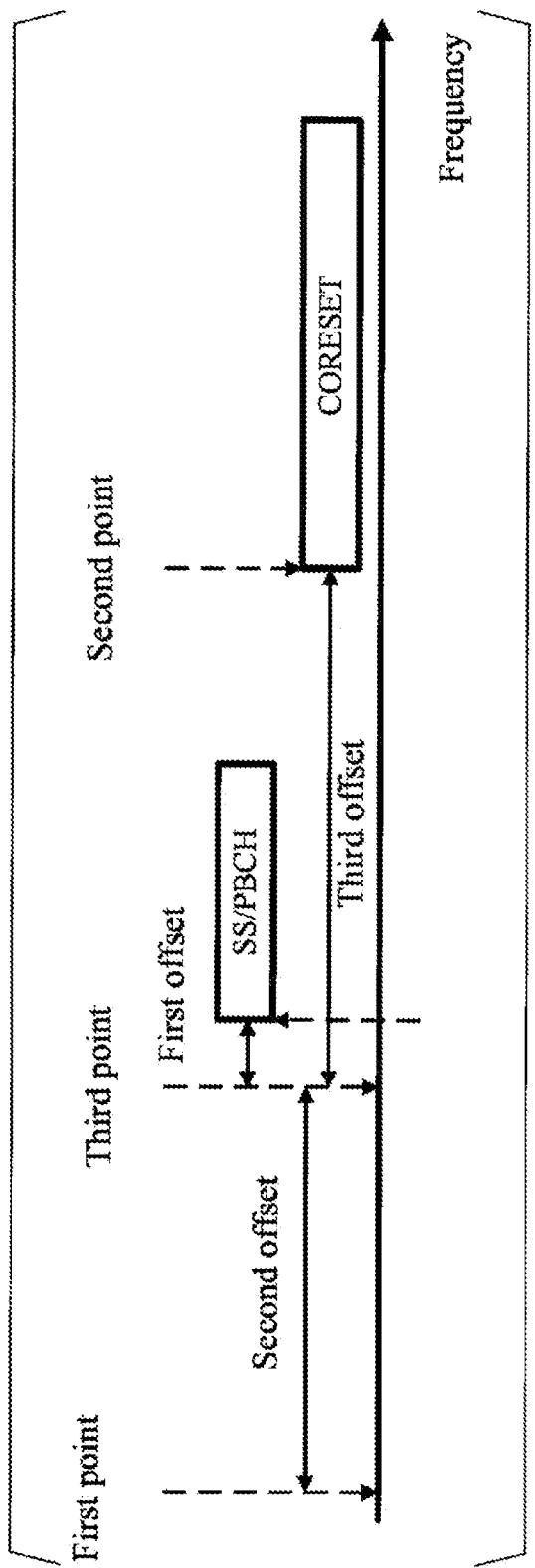
FIG. 9 is a diagram illustrating an example of a communication method according to an aspect of the present embodiment.

FIG. 9 is a diagram illustrating an example of a communication method according to an aspect of the present embodiment. In FIG. 9, a first point, a Second point, and a Third point are provided on the resource grid. The first point is also referred to as point A. Point A may be used for mapping a physical channel and/or a reference signal associated with the physical channel.

For CORESET #0, the Reference point for the mapping of the DMRS associated with the PDSCH may be the index of the subcarrier at the beginning of the multiple subcarriers included in the CORESET #0. The reference point for mapping of the DMRS associated with the PDSCH scheduled based on the DCI format included in the PDCCH detected in the search space set of CORESET #0 may be the index of the subcarrier at the beginning of the multiple subcarriers included in the CORESET #0. The CORESET #0 may be a CORESET configured based on the MIB included in the PBCH.

For a CORESET other than CORESET #0, the Reference point for the mapping of the DMRS associated with the PDSCH may be the subcarrier #0 (or the first point) included in the common resource block #0. The reference point for mapping of the DMRS associated with the PDSCH scheduled based on the DCI format included in the PDCCH detected in the search space set of a CORESET other than CORESET #0 may be the subcarrier #0 (or the first point) included in the common resource block #0.

Figure 10:
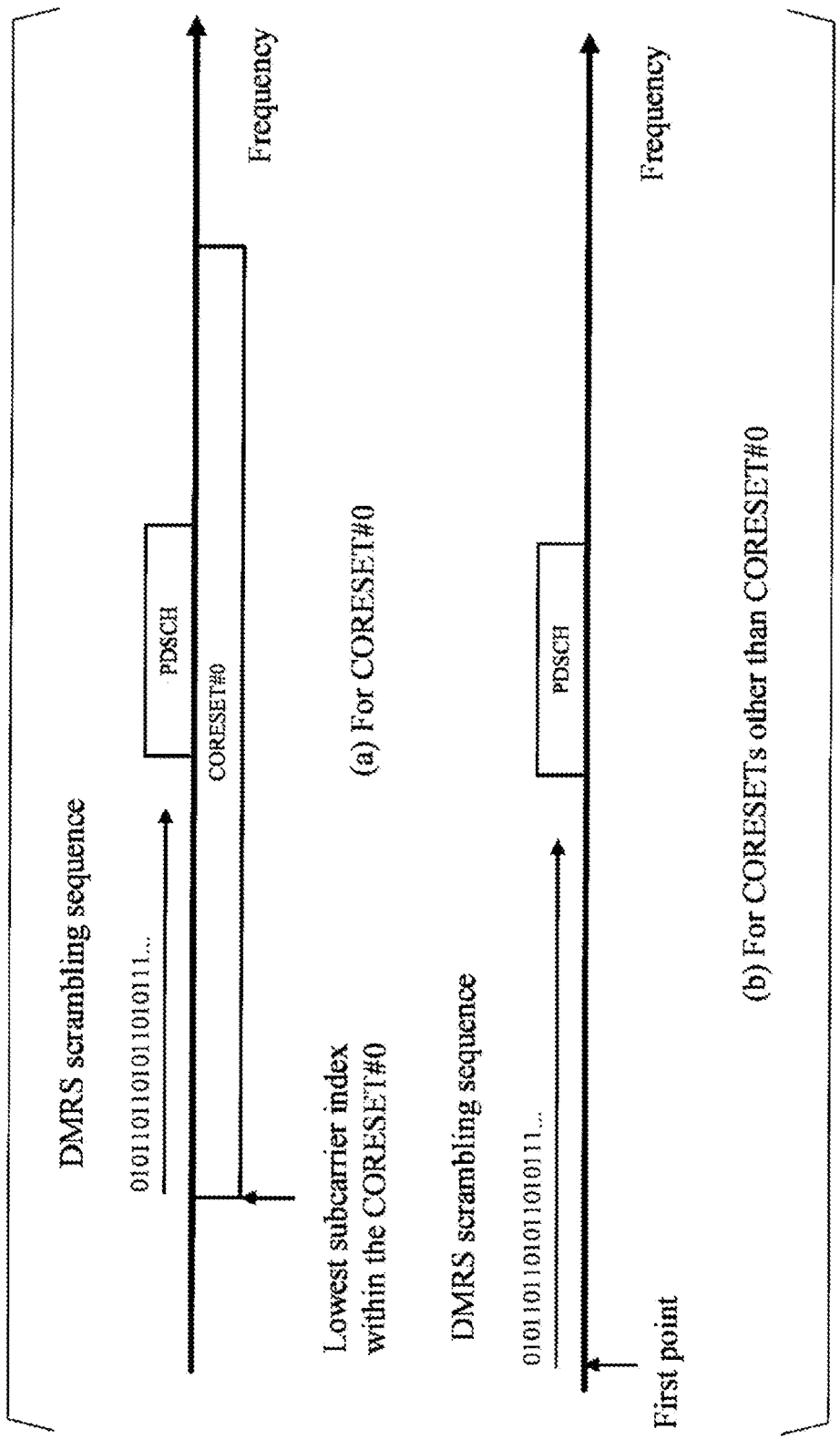
FIG. 10 is diagram illustrating an example of mapping of a DMRS according to an aspect of the present embodiment.

FIG. 10 is diagram illustrating an example of mapping of a DMRS according to an aspect of the present embodiment. FIG. 10(a) begins with a first point for a virtual mapping of the DMRS associated with the PDSCH for CORESET #0. On the other hand, the resource to which the DMRS is actually mapped is within a resource block to which the PDSCH is mapped. FIG. 10(b) begins with a first point for a virtual mapping of the DMRS associated with the PDSCH for a CORESET other than CORESET #0. On the other hand, the resource to which the DMRS is actually mapped is within a resource block to which the PDSCH is mapped.

The reference point of the mapping of the DMRS may be the start point of the virtual mapping of the DMRS sequence. The DMRS may be virtually mapped from the reference point of the mapping of the DMRS. The resource to which the DMRS is actually mapped may be within a resource block to which the physical channel associated with the DMRS is mapped.

For CORESET #0, the Reference point for the mapping of the DMRS associated with the PDCCH may be the index of the subcarrier at the beginning of the multiple subcarriers included in the CORESET #0. The reference point for mapping of the DMRS associated with the PDCCH detected in the search space set of CORESET #0 may be the index of the subcarrier at the beginning of the multiple subcarriers included in the CORESET #0.

For a CORESET other than CORESET #0, the Reference point for the mapping of the DMRS associated with the PDSCH may be the subcarrier #0 (or the first point) included in the common resource block #0. The reference point for mapping of the DMRS associated with the PDSCH scheduled based on the DCI format included in the PDCCH detected in the search space set of a CORESET other than CORESET #0 may be the subcarrier #0 (or the first point) included in the common resource block #0.

The reference point v of the mapping of the DMRS associated with the PBCH may be given based at least on the cell ID. The reference point v may be given by v=mod ($N_{cell}$, 4).

The first point may be a reference point in the set of common resource blocks for the first subcarrier spacing configuration μ. The first point may correspond to a subcarrier of index #0 included in a common resource block of index #0 included in the set of common resource blocks for the first subcarrier spacing configuration μ.

The second point may correspond to an index of the common resource block at the beginning of the one or multiple common resource blocks to which the CORESET #0 is mapped. The one or multiple common resource blocks to which the CORESET #0 is mapped may be included in a set of common resource blocks for the third subcarrier spacing configuration μ. The second point may correspond to an index of the subcarrier at the beginning of the multiple subcarriers included in the common resource block at the beginning of the one or multiple common resource blocks to which the CORESET #0 is mapped. The index of the common resource block at the beginning of one or multiple common resource blocks to which the CORESET #0 is mapped is also referred to as $N^{CORESET\_init\_start}{}_{RB}$. The index of the subcarrier at the beginning of the multiple subcarriers included in the common resource block at the beginning of the one or multiple common resource blocks to which the CORESET #0 is mapped is also referred to as $N^{CORESET\_init\_start}_{sc}$.

The First offset $N_{offset1}$ may indicate a difference (offset) from the third point to the index $\#N^{PBCH\_start}_{sc}$ of the subcarrier at the beginning of the one or multiple subcarriers to which the SS/PBCH is mapped. The first offset $N_{offset1}$ may be given as the number of subcarriers included in the common resource block for the second subcarrier spacing configuration μ. The index of the common resource block including the subcarrier of index $\#N^{PBCH\_start}_{sc}$ is also referred to as $N^{PBCH\_start}_{RB}$. The common resource block $\#N^{PBCH\_start}_{RB}$ may be the index of the common resource block at the beginning of the one or multiple resource blocks to which the SS/PBCH is fully or partially mapped. The index of the common resource block including the subcarrier corresponding to the third point is also referred to as $N^{third\_point}_{RB}$. The index of the subcarrier indicated by the third point may be the index of the subcarrier at the beginning of the multiple subcarriers included in the common resource block $\#N^{third\_point}_{RB}$.

The mapping of the fourth subcarrier spacing configuration μ applied to the PBCH to the common resource block for a prescribed subcarrier spacing configuration μ other than the fourth subcarrier spacing configuration may indicate that the frequency band of the PBCH and the frequency of the common resource block for the prescribed subcarrier spacing configuration μ is the same.

The Second offset $N_{offset2}$ may indicate a difference from the first point to the index $N^{third\_point}_{RB}$ of the common resource block including the third point. The second offset $N_{offset2}$ may be given as the number of common resource blocks for the first subcarrier spacing configuration μ. The second offset $N_{offset2}$ may be equal to $N^{third\_point}_{RB}$.

In the Third offset $N_{offset3}$, the index # of the common resource block corresponding to the second point may indicate a difference from the $N^{CORESET\_init\_start}_{RB}$ to the index $N^{third\_point}_{RB}$ of the common resource block including the third point. The third offset $N_{offset3}$ may be given as the number of common resource blocks for the third subcarrier spacing configuration μ.

The first offset $N_{offset1}$ may be given based at least on the PBCH. The first offset $N_{offset1}$ may be given based at least on the MIB included in the PBCH. The first offset $N_{offset1}$ may be given based at least on the MIB included in the PBCH and/or the reference signal associated with the PBCH.

The second offset $N_{offset2}$ may be given based at least on the first system information. The second offset $N_{offset2}$ may be given based at least on a higher layer parameter.

The third offset $N_{offset3}$ may be given based at least on the first system information. The third offset $N_{offset3}$ may be given based at least on a higher layer parameter.

The frequency corresponding to the first point may be given at least based on a higher layer parameter. The frequency corresponding to the first point may be indicated by an index of the higher layer parameter ARFCN.

The frequency corresponding to the second point may be given at least based on a higher layer parameter. The frequency corresponding to the second point may be indicated by an index of the higher layer parameter ARFCN.

The frequency corresponding to the third point may be given at least based on a higher layer parameter. The frequency corresponding to the third point may be indicated by an index of the higher layer parameter ARFCN.

The third subcarrier spacing configuration μ may be given at least based on the higher layer parameter included in the PBCH.

The first subcarrier spacing configuration μ may be a first prescribed subcarrier spacing configuration μ. The second subcarrier spacing configuration μ may be a first prescribed subcarrier spacing configuration μ. The first prescribed subcarrier spacing configuration μ may be 0.

In the SS/PBCH type applied to the frequency band defined in the frequency band where the carrier frequency is below 6 GHz (below 6 GHz frequency band), the first subcarrier spacing configuration μ may be the first prescribed subcarrier spacing configuration μ. In the SS/PBCH type applied to the frequency band defined in the frequency band where the carrier frequency is below 6 GHz (below 6 GHz frequency band), the second subcarrier spacing configuration μ may be the first prescribed subcarrier spacing configuration. In the SS/PBCH type applied to the frequency band defined in the frequency band where the carrier frequency is below 6 GHz (below 6 GHz frequency band), the first prescribed subcarrier spacing configuration μ may be 0.

The first subcarrier spacing configuration μ may be a second prescribed subcarrier spacing configuration The second subcarrier spacing configuration μ may be given at least based on the higher layer parameter included in the PBCH. The higher layer parameter may be a higher layer parameter indicating at least the third subcarrier spacing configuration μ.

In the SS/PBCH type applied to the frequency band defined in the frequency band where the carrier frequency is above 6 GHz (above 6 GHz frequency band), the first subcarrier spacing configuration μ may be the second prescribed subcarrier spacing configuration μ. In the SS/PBCH type applied to the frequency band defined in the frequency band where the carrier frequency is above 6 GHz (above 6 GHz frequency band), the second subcarrier spacing configuration μ may be given based at least on the higher layer parameter included in the PBCH. In the SS/PBCH type applied to the frequency band defined in the frequency band where the carrier frequency is above 6 GHz (above 6 GHz frequency band), the higher layer parameter may be a higher layer parameter indicating at least the third subcarrier spacing configuration μ.

The number $N^{BWP\_init}_{RB}$ of the common resource blocks in the initial downlink BWP may be given based at least on some or all of the number $N^{PBCH}_{RB}$ of common resource blocks corresponding to the bandwidth of the SS/PBCH, the number $N^{PBCH\_overlap}_{RB}$ of common resource blocks to which the SS/PBCH is fully or partially mapped, the number $N^{CORESET\_init}_{RB}$ of common resource blocks to which the CORESET #0 is mapped, and the third offset $N_{offset3}$. The number $N^{BWP\_init}_{RB}$ of the common resource blocks in the initial downlink BWP may be given based on at least Equation 3.

$$N^{BWP\_init}_{RB} = \max(N^{CORESET\_init}_{RB} - N_{offset3}, N_{offset3} + N^{PBCH\_overlap}_{RB}) \quad \text{Equation 3}$$

max (A, B) may be a function that outputs a larger value of A and B in a case that A and B are different values. max (A, B) may be a function that outputs A or B in a case that A and B are the same value.

For example, in a case that the SS/PBCH and the CORESET #0 are subjected to Frequency Division Multiplexing (FDM), the number $N^{BWP\_init}_{RB}$ of the common resource blocks in the initial downlink BWP may be given based on at least Equation 1. Frequency division multiplexing of the SS/PBCH and the CORESET #0 may be that the frequency of all subcarriers to which the SS/PBCH is mapped and the frequency of all subcarriers to which the CORESET #0 is mapped are different.

For example, in a case that the SS/PBCH and the CORESET #0 are subjected to frequency division multiplexing and the third offset $N_{offset3}$ is a negative value, the number $N^{BWP\_init}_{RB}$ of the common resource blocks in the initial downlink BWP may be $N^{CORESET\_init}_{RB} - N_{offset3}$.

For example, in a case that the SS/PBCH and the CORESET #0 are subjected to frequency division multiplexing, the third offset $N_{offset3}$ is a positive value, and the first offset $N_{offset1}$ matches the boundary of the common resource block, the number $N^{BWP\_Init}_{RB}$ of the common resource blocks in the initial downlink BWP may be $N_{offset3} + N^{PBCH}_{RB}$.

For example, in a case that the SS/PBCH and the CORESET #0 are subjected to frequency division multiplexing, the third offset $N_{offset3}$ is a positive value, and the value of the first offset $N_{offset1}$ is 0 or 12, the number $N^{BWP\_init}_{RB}$ of the common resource blocks in the initial downlink BWP may be $N_{offset3} + N^{PBCH}_{RB}$.

For example, in a case that the SS/PBCH and the CORESET #0 are subjected to frequency division multiplexing and the third offset $N_{offset3}$ is a positive value, the number $N^{BWP\_init}_{RB}$ of the common resource blocks in the initial downlink BWP may be $N_{offset3} + N^{PBCH\_overlap}_{RB}$.

For example, in a case that the SS/PBCH and the CORESET #0 are subjected to frequency division multiplexing, the third offset $N_{offset3}$ is a positive value, and the first offset $N_{offset1}$ does not match the boundary of the common resource block, the number $N^{BWP\_init}_{RB}$ of the common resource blocks in the initial downlink BWP may be $N_{offset3} + N^{PBCH}_{RB} + 1$.

For example, in a case that the SS/PBCH and the CORESET #0 are subjected to frequency division multiplexing, the third offset $N_{offset3}$ is a positive value, and the value of the first offset $N_{offset1}$ is different from 0 and 12, the number $N^{BWP\_init}_{RB}$ of the common resource blocks in the initial downlink BWP may be $N_{offset3} + N^{PBCH}_{RB} + 1$.

For example, in a case that the SS/PBCH and the CORESET #0 are not subjected to frequency division multiplexing (or the SS/PBCH and the CORESET #0 are subjected to time division multiplexing), the number $N^{BWP\_init}_{RB}$ of the common resource blocks in the initial downlink BWP may be $N^{CORESET\_init}_{RB}$. Not performing the frequency division multiplexing of the SS/PBCH and the CORESET #0 may be that a portion of the frequency of the subcarriers to which the SS/PBCH is mapped and a portion of the frequency of the subcarriers to which the CORESET #0 is mapped may at least correspond to each other.

Figure 11:
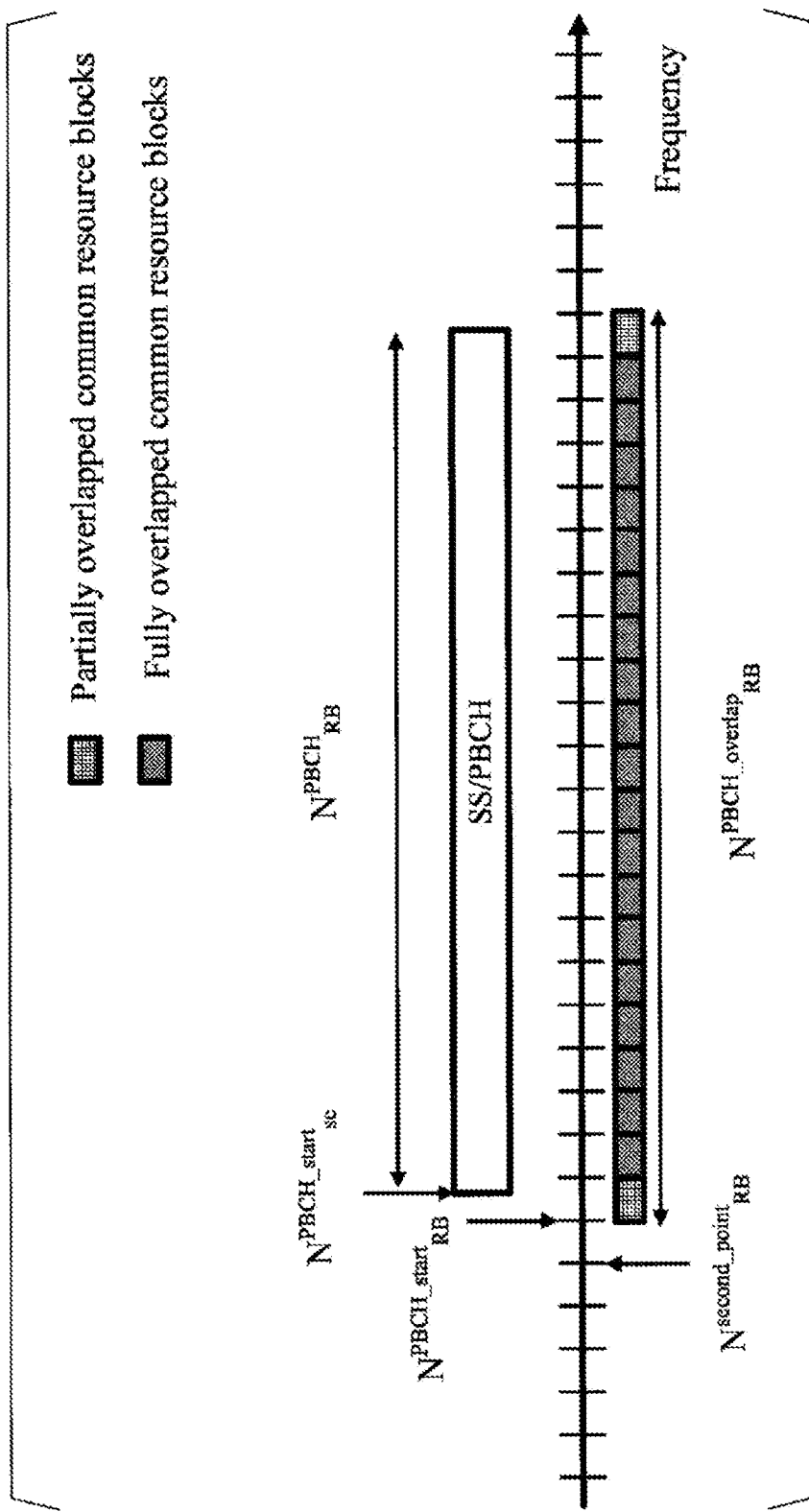
FIG. 11 is a diagram illustrating an example of $N^{PBCH\_overlap}_{RB}$ according to an aspect of the present embodiment.

FIG. 11 is a diagram illustrating an example of $N^{PBCH\_overlap}_{RB}$ according to an aspect of the present embodiment. As illustrated in FIG. 11, in a case that the subcarrier at the beginning of the one or multiple subcarriers to which the SS/PBCH is mapped does not match the common resource block, $N^{PBCH\_overlap}_{RB}$ is equal to $N^{PBCH}_{RB} + 1$. In other words, the $N^{PBCH\_overlap}_{RB}$ may indicate the number of common resource blocks to which the SS/PBCH is fully or partially mapped. The common resource block to which the SS/PBCH is fully mapped may be a common resource block such that the SS/PBCH is mapped to all subcarriers included in the common resource block. The common resource block to which the SS/PBCH is fully mapped may be a common resource block such that at least a portion of the SS/PBCH is mapped to all subcarriers included in the common resource block. The common resource block to which the SS/PBCH is partially mapped may be a common resource block such that the SS/PBCH is mapped to some subcarriers included in the common resource block. The common resource block to which the SS/PBCH is partially mapped may be a common resource block such that at least a portion of the SS/PBCH is mapped to some subcarriers included in the common resource block. $N^{PBCH}_{RB}$ is the number of common resource blocks corresponding to the bandwidth of the SS/PBCH. $N^{PBCH}_{RB}$ may be equal to 20.

The common resource blocks corresponding to the blocks indicated by the cross stripes illustrated in FIG. 11 indicate common resource blocks (Partially overlapped common resource blocks) to which the SS/PBCH is partially mapped. The common resource blocks corresponding to the blocks indicated by the diagonal lines illustrated in FIG. 11 indicate common resource blocks (Fully overlapped common resource blocks) to which the SS/PBCH is fully mapped.

Figure 12:
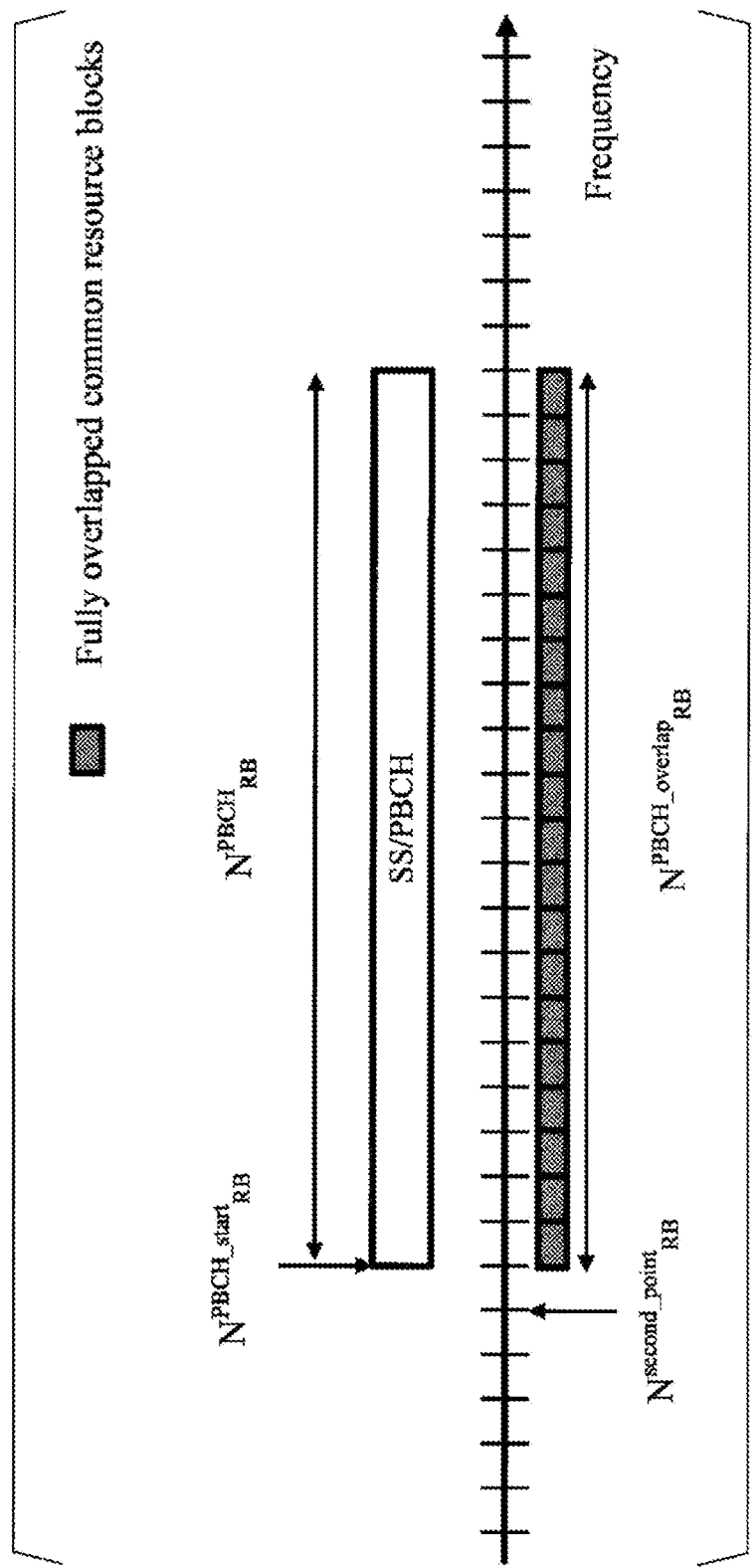
FIG. 12 is a diagram illustrating an example of $N^{PBCH\_overlap}_{RB}$ according to an aspect of the present embodiment.

FIG. 12 is a diagram illustrating an example of $N^{PBCH\_overlap}_{RB}$ according to an aspect of the present embodiment. As illustrated in FIG. 12, in a case that the subcarrier at the beginning of the one or multiple subcarriers to which the SS/PBCH is mapped matches the boundary of the common resource block, $N^{NPBCH\_overlap}_{RB}$ is equal to $N^{PBCH}_{RB}$. In other words, the $N^{PBCH\_overlap}_{RB}$ may be equal to the number of common resource blocks to which the SS/PBCH is fully mapped.

The common resource blocks corresponding to the blocks indicated by the diagonal lines illustrated in FIG. 12 indicate common resource blocks (Fully overlapped common resource blocks) to which the SS/PBCH is fully mapped.

The number $N^{BWP\_init}_{RB}$ of the common resource blocks in the initial downlink BWP may be given based at least on some or all of the number $N^{PBCH}_{RB}$ of common resource blocks corresponding to the bandwidth of the SS/PBCH, the number $N^{CORESET\_init}_{RB}$ of common resource blocks to which the CORESET #0 is mapped, the first offset $N_{offset1}$, and the third offset $N_{offset3}$. The number $N^{BWP\_init}_{RB}$ of the common resource blocks in the initial downlink BWP may be given based on at least Equation 4.

$$N^{BWP\_init}_{RB} = \max(N^{CORESET\_init}_{RB} - N_{offset3}, N_{offset3} + N^{PBCH}_{RB} + \text{ceil}(\text{mod}(N_{offset1}, N^{RB}_{sc})/N^{RB}_{sc})) \quad \text{Equation 4}$$

mod (C, D) is a function that outputs the remainder of C divided by D. ceil (E) may be a function that outputs a minimum integer under conditions not below E. ceil (E) is also referred to as a ceiling function.

For example, in a case that the SS/PBCH and the CORESET #0 are subjected to frequency division multiplexing and the third offset $N_{offset3}$ is a negative value, the number $N^{BWP\_init}_{RB}$ of the common resource blocks in the initial downlink BWP may be $N^{CORESET\_init}_{RB} - N_{offset3}$.

For example, in a case that the SS/PBCH and the CORESET #0 are subjected to frequency division multiplexing and the third offset $N_{offset3}$ is a positive value, the number $N^{BWP\_init}_{RB}$ of the common resource blocks of the initial downlink BWP may be $N_{offset3} + N^{PBCH}_{RB} + \text{ceil}(\text{mod}(N_{offset1}, N^{RB}_{sc})/N^{RB}_{sc})$.

For example, in a case that the SS/PBCH and the CORESET #0 are not subjected to frequency division multiplexing (or the SS/PBCH and the CORESET #0 are subjected to time division multiplexing), the number $N^{BWP\_init}_{RB}$ of the common resource blocks in the initial downlink BWP may be $N^{CORESET\_init}_{RB}$.

Figure 13:
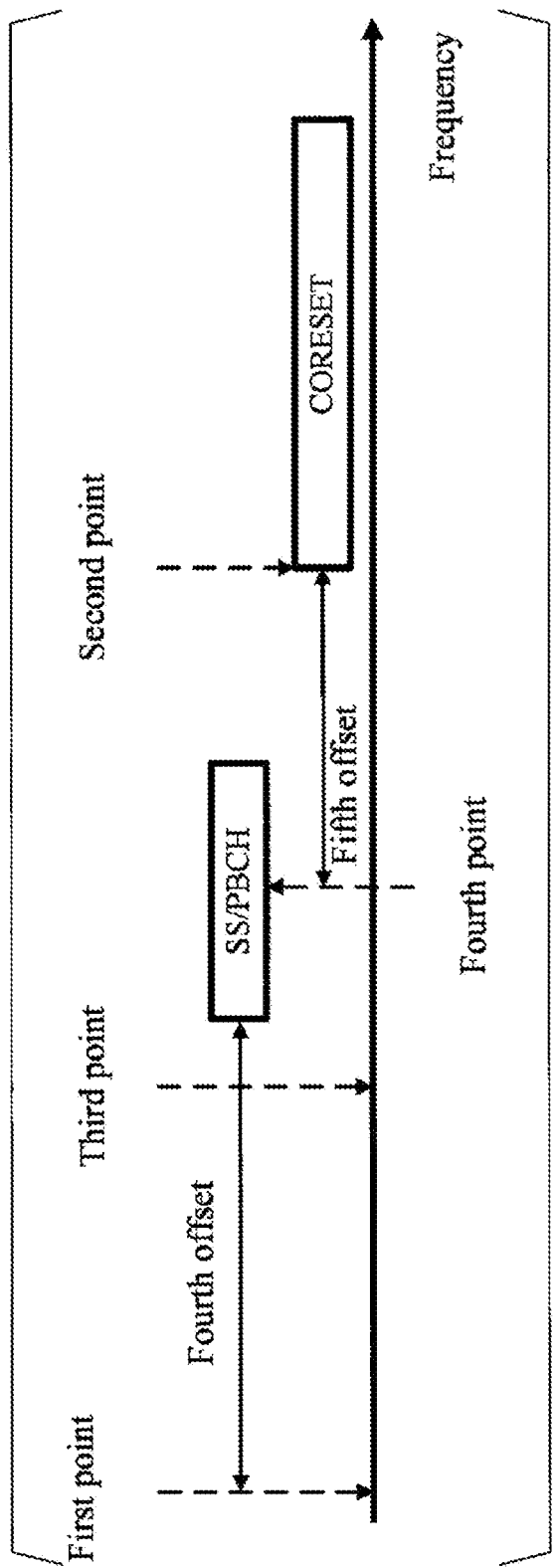
FIG. 13 is a diagram illustrating an example of a communication method according to an aspect of the present embodiment.

FIG. 13 is a diagram illustrating an example of a communication method according to an aspect of the present embodiment. In FIG. 13, a first point, a second point, a third point, and a fourth point are provided on the resource grid. The fourth point indicates the index $N^{PBCH\_start}_{sc}$ of the subcarrier at the beginning of one or multiple subcarriers to which the SS/PBCH is mapped.

The frequency corresponding to the fourth point may be given at least based on a higher layer parameter. The frequency corresponding to the fourth point may be indicated by an index of ARFCN.

The fourth offset $N_{offset4}$ may indicate the difference from the index of the subcarrier indicated by the first point to the index $N^{PBCH\_start}_{sc}$ of the subcarrier indicated by the fourth point.

The fifth offset $N_{offset5}$ may indicate the difference from the index of the subcarrier indicated by the second point to the index $N^{PBCH\_start}_{sc}$ of the subcarrier indicated by the fourth point.

The number $N^{BWP\_init}_{RB}$ of the common resource blocks in the initial downlink BWP may be given based at least on some or all of the number $N^{PBCH}_{RB}$ of common resource blocks corresponding to the bandwidth of the SS/PBCH, the number $N^{CORESET\_init}_{RB}$ of common resource blocks to which the CORESET #0 is mapped, the first offset $N_{offset1}$, the third offset $N_{offset3}$, and the fourth offset $N_{offset4}$. The number $N^{BWP\_Init}_{RB}$ of the common resource blocks in the initial downlink BWP may be given based on at least Equation 5.

$$N^{BWP\_init}_{RB}=\max(N^{CORESET\_init}_{RB}-N_{offset3}, N_{offset3}+N^{PBCH}_{RB}+\mathrm{ceil}(\mathrm{mod}(N^{RB}_{sc})/N^{RB}_{sc}))  \quad \text{Equation 5}$$

For example, in a case that the SS/PBCH and the CORESET #0 are subjected to frequency division multiplexing and the third offset $N_{offset3}$ is a negative value, the number $N^{CORESET\_init}_{RB}$ of the common resource blocks in the initial downlink BWP may be $N^{CORESET\_init}_{RB}-N_{offset3}$.

For example, in a case that the SS/PBCH and the CORESET #0 are subjected to frequency division multiplexing and the third offset $N_{offset3}$ is a positive value, the number $N^{BWP\_init}_{RB}$ of the common resource blocks of the initial downlink BWP may be $N_{offset3}+N^{PBCH}_{RB}+\mathrm{ceil}(\mathrm{mod}(N_{offset4}, N^{RB}_{sc})/N^{RB}_{sc})$.

For example, in a case that the SS/PBCH and the CORESET #0 are subjected to frequency division multiplexing, the third offset $N_{offset3}$ is a positive value, and the fourth offset $N_{offset4}$ matches the boundary of the common resource block, the number $N^{BWP\_Init}_{RB}$ of the common resource blocks in the initial downlink BWP may be $N_{offset3}+N^{PBCH}_{RB}$.

For example, in a case that the SS/PBCH and the CORESET #0 are subjected to frequency division multiplexing, the third offset $N_{offset3}$ is a positive value, and the value of the fourth offset $N_{offset4}$ is 0 or a multiple of 12, the number $N^{BWP\_init}_{RB}$ of the common resource blocks in the initial downlink BWP may be $N_{offset3}+N^{PBCH}_{RB}$.

For example, in a case that the SS/PBCH and the CORESET #0 are subjected to frequency division multiplexing, the third offset $N_{offset3}$ is a positive value, and the fourth offset $N_{offset4}$ does not match the boundary of the common resource block, the number $N^{BWP\_init}_{RB}$ of the common resource blocks in the initial downlink BWP may be $N_{offset3}+N^{PBCH}_{RB}+1$.

For example, in a case that the SS/PBCH and the CORESET #0 are subjected to frequency division multiplexing, the third offset $N_{offset3}$ is a positive value, and the value of the fourth offset $N_{offset4}$ is different from 0 and is not a multiple of 12, the number $N^{BWP\_init}_{RB}$ of the common resource blocks in the initial downlink BWP may be $N_{offset3}+N^{PBCH}_{RB}+1$.

For example, in a case that the SS/PBCH and the CORESET #0 are not subjected to frequency division multiplexing (or the SS/PBCH and the CORESET #0 are subjected to time division multiplexing), the number $N^{BWP\_init}_{RB}$ of the common resource blocks in the initial downlink BWP may be $N^{CORESET\_init}_{RB}$.

The number $N^{BWP\_init}_{RB}$ of the common resource blocks in the initial downlink BWP may be given based at least on some or all of the number $N^{PBCH}_{RB}$ of common resource blocks corresponding to the bandwidth of the SS/PBCH, the number $N^{CORESET\_init}_{RB}$ of common resource blocks to which the CORESET #0 is mapped, the first offset $N_{offset1}$, the third offset $N_{offset3}$, and the fifth offset $N_{offset5}$. The number $N^{BWP\_init}_{RB}$ of the common resource blocks in the initial downlink BWP may be given based on at least Equation 6.

$$N^{BWP\_init}_{RB}=\max(N^{CORESET\_init}_{RB}-N_{offset5}, N_{offset3}+N^{PBCH}_{RB}+\mathrm{ceil}(\mathrm{mod}(N_{offset5}, N^{RB}_{sc})/N^{RB}_{sc})) \quad \text{Equation 6}$$

For example, in a case that the SS/PBCH and the CORESET #0 are subjected to frequency division multiplexing and the third offset $N_{offset3}$ is a negative value, the number $N^{BWP\_init}_{RB}$ of the common resource blocks in the initial downlink BWP may be $N^{CORESET\_init}_{RB}-N_{offset3}$.

For example, in a case that the SS/PBCH and the CORESET #0 are subjected to frequency division multiplexing and the third offset $N_{offset3}$ is a positive value, the number $N^{BWP\_init}_{RB}$ of the common resource blocks of the initial downlink BWP may be $N_{offset3}+N^{PBCH}_{RB}+\mathrm{ceil}(\mathrm{mod}(N_{offset5}, N^{RB}_{sc})/N^{RB}_{sc})$.

For example, in a case that the SS/PBCH and the CORESET #0 are subjected to frequency division multiplexing, the third offset $N_{offset3}$ is a positive value, and the fifth offset $N_{offset5}$ matches the boundary of the common resource block, the number $N^{BWP\_init}_{RB}$ of the common resource blocks in the initial downlink BWP may be $N_{offset3}+N^{PBCH}_{RB}$.

For example, in a case that the SS/PBCH and the CORESET #0 are subjected to frequency division multiplexing, the third offset $N_{offset3}$ is a positive value, and the value of the fifth offset $N_{offset5}$ is 0 or a multiple of 12, the number $N^{BWP\_init}_{RB}$ of the common resource blocks in the initial downlink BWP may be $N_{offset3}+N^{PBCH}_{RB}$.

For example, in a case that the SS/PBCH and the CORESET #0 are subjected to frequency division multiplexing, the third offset $N_{offset3}$ is a positive value, and the fifth offset $N_{offset5}$ does not match the boundary of the common resource block, the number $N^{BWP\_init}_{RB}$ of the common resource blocks in the initial downlink BWP may be $N_{offset3}+N^{PBCH}_{RB}+1$.

For example, in a case that the SS/PBCH and the CORESET #0 are subjected to frequency division multiplexing, the third offset $N_{offset3}$ is a positive value, and the value of the fifth offset $N_{offset5}$ is different from 0 and is not a multiple of 12, the number $N^{BWP\_init}_{RB}$ of the common resource blocks in the initial downlink BWP may be $N_{offset3}+N^{PBCH}_{RB}+1$.

For example, in a case that the SS/PBCH and the CORESET #0 are not subjected to frequency division multiplexing (or the SS/PBCH and the CORESET #0 are subjected to time division multiplexing), the number $N^{BWP\_init}_{RB}$ of the common resource blocks in the initial downlink BWP may be $N^{CORESET\_init}_{RB}$.

The payload size of the first downlink DCI format detected in the CSS of the control resource set in the downlink BWP may be given based at least on the number $N^{BWP\_init}_{RB}$ of the resource blocks in the initial downlink BWP. The size of the frequency domain resource allocation field included in the first downlink DCI format may be given at least based on the number $N^{BWP\_init}_{RB}$ of the resource blocks of the initial downlink BWP. The maximum number of resource blocks in the downlink BWP that can be allocated by the frequency domain resource allocation field may be given based at least on the number $N^{BWP\_init}_{RB}$ of the resource blocks in the initial downlink BWP. For example, in a case that the number $N^{BWP}_{RB}$ of resource blocks in the downlink BWP is smaller than $N^{BWP\_init}_{RB}$, the maximum number of resource blocks of the downlink BWP that can be allocated by the frequency domain resource allocation field may be $N^{BWP}_{RB}$. For example, in a case that the number $N^{BWP}_{RB}$ of resource blocks in the downlink BWP is equal to $N^{BWP\_init}_{RB}$, the maximum number of resource blocks of the downlink BWP that can be allocated by the frequency domain resource allocation field may be $N^{BWP}_{RB}$ or $N^{BWP\_init}_{RB}$. For example, in a case that the number $N^{BWP}_{RB}$ of resource blocks in the downlink BWP is greater than $N^{BWP\_init}_{RB}$, the maximum number of resource blocks of the downlink BWP that can be allocated by the frequency domain resource allocation field may be $N^{BWP\_init}_{RB}$.

Regardless of whether or not the number $N^{BWP}_{RB}$ of resource blocks of the downlink BWP is greater than $N^{BWP\_init}_{RB}$, the maximum number of resource blocks of the downlink BWP that can be allocated by the frequency domain resource allocation field may be $N^{BWP\_init}_{RB}$.

Regardless of whether or not the number $N^{BWP}_{RB}$ of resource blocks of the downlink BWP is greater than $N^{BWP\_init}_{RB}$, the maximum number of resource blocks of the downlink BWP that can be allocated by the frequency domain resource allocation field may be $N^{BWP}_{RB}$.

The maximum number of resource blocks in the downlink BWP that can be allocated by the frequency domain resource allocation field may be given based at least on the number $N^{CORESET\_init}_{RB}$ of resource blocks to which the CORESET #0 is mapped. For example, in a case that the number $N^{BWP}_{RB}$ of resource blocks in the downlink BWP is smaller than $N^{CORESET\_init}_{RB}$, the maximum number of resource blocks of the downlink BWP that can be allocated by the frequency domain resource allocation field may be $N^{BWP}_{RB}$. For example, in a case that the number $N^{BWP}_{RB}$ of resource blocks in the downlink BWP is equal to $N^{CORESET\_init}_{RB}$, the maximum number of resource blocks of the downlink BWP that can be allocated by the frequency domain resource allocation field may be $N^{BWP}_{RB}$ or $N^{CORESET\_init}_{RB}$. For example, in a case that the number $N^{BWP}_{RB}$ of resource blocks in the downlink BWP is greater than $N^{CORESET\_init}_{RB}$, the maximum number of resource blocks of the downlink BWP that can be allocated by the frequency domain resource allocation field may be $N^{CORESET\_init}_{RB}$.

Regardless of whether or not the number $N^{BWP}_{RB}$ of resource blocks in the downlink BWP is greater than $N^{CORESET\_init}_{RB}$, the maximum number of resource blocks of the downlink BWP that can be allocated by the frequency domain resource allocation field may be $N^{CORESET\_init}_{RB}$.

Regardless of whether or not the number $N^{BWP}_{RB}$ of resource blocks of the downlink BWP is greater than $N^{CORESET\_init}_{RB}$, the maximum number of resource blocks of the downlink BWP that can be allocated by the frequency domain resource allocation field may be $N^{BWP}_{RB}$.

The maximum number of resource blocks in the downlink BWP that can be allocated by the frequency domain resource allocation field may be given based at least on the number $N^{CORESET}_{RB}$ of resource blocks to which the control resource set in the downlink BWP is mapped. For example, in a case that the number $N^{CORESET}_{RB}$ or resource blocks to which the control resource set in the downlink BWP is mapped is smaller than $N^{BWP\_init}_{RB}$, the maximum number of resource blocks in the downlink BWP that can be allocated by the frequency domain resource allocation field may be $N^{CORESET}_{RB}$. For example, in a case that the number $N^{CORESET}_{RB}$ of resource blocks to which the control resource set in the downlink BWP is mapped is equal to $N^{BWP\_init}_{RB}$, the maximum number of resource blocks in the downlink BWP that can be allocated by the frequency domain resource allocation field may be $N^{CORESET}_{RB}$ or $N^{BWP\_init}_{RB}$. For example, in a case that the number $N^{CORESET}_{RB}$ of resource blocks to which the control resource set in the downlink BWP is mapped is greater than $N^{BWP\_init}_{RB}$, the maximum number of resource blocks in the downlink BWP that can be allocated by the frequency domain resource allocation field may be $N^{BWP\_init}_{RB}$.

Regardless of whether or not the number $N^{CORESET}_{RB}$ of resource blocks to which the control resource set in the downlink BWP is mapped is greater than $N^{BWP\_init}_{RB}$, the maximum number of resource blocks in the downlink BWP that can be allocated by the frequency domain resource allocation field may be $N^{BWP\_init}_{RB}$.

Regardless of whether or not the number $N^{CORESET}_{RB}$ of resource blocks to which the control resource set in the downlink BWP is mapped is greater than $N^{BWP\_init}_{RB}$, the maximum number of resource blocks in the downlink BWP that can be allocated by the frequency domain resource allocation field may be $N^{CORESET}_{RB}$.

For example, in a case that the number $N^{CORESET}_{RB}$ of resource blocks to which the control resource set in the downlink BWP is mapped is smaller than $N^{CORESET\_init}_{RB}$, the maximum number of resource blocks in the downlink BWP that can be allocated by the frequency domain resource allocation field may be $N^{CORESET}_{RB}$. For example, in a case that the number $N^{CORESET}_{RB}$ of resource blocks to which the control resource set in the downlink BWP is mapped is equal to $N^{CORESET\_init}_{RB}$, the maximum number of resource blocks in the downlink BWP that can be allocated by the frequency domain resource allocation field may be $N^{CORESET}_{RB}$ or $N^{CORESET\_init}_{RB}$. For example, in a case that the number $N^{CORESET}_{RB}$ of resource blocks to which the control resource set in the downlink BWP is mapped is greater than $N^{CORESET\_init}_{RB}$, the maximum number of resource blocks in the downlink BWP that can be allocated by the frequency domain resource allocation field may be $N^{CORESET\_init}_{RB}$.

Regardless of whether or not the number $N^{CORESET}_{RB}$ of resource blocks to which the control resource set in the downlink BWP is mapped is greater than $N^{CORESET\_init}_{RB}$, the maximum number of resource blocks in the downlink BWP that can be allocated by the frequency domain resource allocation field may be $N^{CORESET\_init}_{RB}$.

Regardless of whether or not the number $N^{CORESET}_{RB}$ of resource blocks to which the control resource set in the downlink BWP is mapped is greater than $N^{CORESET\_init}_{RB}$, the maximum number of resource blocks in the downlink BWP that can be allocated by the frequency domain resource allocation field may be $N^{CORESET}_{RB}$.

An index of a resource block at the beginning of one or multiple resource blocks of the downlink BWP that can be allocated by the frequency domain resource allocation field may be the index $N^{CORESET\_start}_{RB}$ of a resource block at the beginning of one or multiple resource blocks to which the control resource set is mapped.

In a case that the prescribed condition 101 is not satisfied, the payload size of the first DCI format detected in the USS of the control resource set in the downlink BWP may be given based at least on the number $N^{BWP\_init}_{RB}$ of the resource blocks in the initial downlink BWP. The size of the frequency domain resource allocation field included in the first downlink DCI format may be given at least based on the number $N^{BWP\_init}_{RB}$ of the resource blocks of the initial downlink BWP. The maximum number of resource blocks in the downlink BWP that can be allocated by the frequency domain resource allocation field may be given based at least on the number $N^{BWP\_init}_{RB}$ of the resource blocks in the initial downlink BWP. The maximum number of resource blocks in the downlink BWP that can be allocated by the frequency domain resource allocation field may be the number $N^{BWP}_{RB}$ of resource blocks in the downlink BWP. An index of a resource block at the beginning of one or multiple resource blocks of the downlink BWP that can be allocated by the frequency domain resource allocation field may be the index $N^{BWP\_start}_{RB}$ of a resource block at the beginning of one or multiple resource blocks of the downlink BWP.

The prescribed condition 101 may include at least one or both of the following conditions 101a and 101b.

Condition 101a) Condition in which the number of different sizes of DCI formats monitored in one slot in one serving cell is equal to or less than 4

101b) The number of different sizes of DCI formats monitored by C-RNTI in one slot in one serving cell is equal to or less than 3

The DCI format monitored by the C-RNTI may be a DCI format including a CRC scrambled with a C-RNTI.

In a case that the prescribed condition 101 is satisfied, the payload size of the first downlink DCI format detected in the USS of the control resource set in the downlink BWP may be given based at least on the number $N^{BWP}_{RB}$ of the resource blocks in the downlink BWP. The size of the frequency domain resource allocation field included in the first downlink DCI format may be given at least based on the number $N^{BWP}_{RB}$ of the resource blocks of the downlink BWP. The maximum number of resource blocks in the downlink BWP that can be allocated by the frequency resource allocation information field may be the number $N^{BWP}_{RB}$ of resource blocks in the downlink BWP. An index of a resource block at the beginning of one or multiple resource blocks of the downlink BWP that can be allocated by the frequency domain resource allocation field may be the index $N^{BWP\_start}_{RB}$ of a resource block at the beginning of one or multiple resource blocks of the downlink BWP.

The payload size of the second downlink DCI format detected in the USS of the control resource set in the downlink BWP may be given based at least on the number $N^{BWP}_{RB}$ of the resource blocks in the downlink BWP. The size of the frequency domain resource allocation field included in the second downlink DCI format may be given at least based on the number $N^{BWP}_{RB}$ of the resource blocks of the downlink BWP. The maximum number of resource blocks in the downlink BWP that can be allocated by the frequency resource allocation information field may be the number $N^{BWP}_{RB}$ of resource blocks in the downlink BWP. An index of a resource block at the beginning of one or multiple resource blocks of the downlink BWP that can be allocated by the frequency domain resource allocation field may be the index $N^{BWP\_start}_{RB}$ of a resource block at the beginning of one or multiple resource blocks of the downlink BWP.

The size of the first uplink DCI format detected in the CSS of the control resource set in the downlink BWP may be given based at least on the number $N^{BWP\_init}_{RB}$ of the resource blocks in the initial downlink BWP. The size of the frequency domain resource allocation field included in the first uplink DCI format may be given at least based on the number $N^{BWP\_init}_{RB}$ of the resource blocks of the initial downlink BWP. The size of the frequency domain resource allocation field included in the first uplink DCI format may be given at least based on the number $N^{BWP\_UL}_{RB}$ of the resource blocks of the uplink BWP. The maximum number of resource blocks in the uplink BWP that can be allocated by the frequency domain resource allocation field may be given based at least on the number $N^{BWP\_init}_{RB}$ of the resource blocks in the initial downlink BWP. For example, in a case that the number $N^{BWP\_UL}_{RB}$ of resource blocks in the uplink BWP is smaller than $N^{BWP\_init}_{RB}$, the maximum number of resource blocks of the uplink BWP that can be allocated by the frequency domain resource allocation field may be $N^{BWP\_UL}_{RB}$. For example, in a case that the number $N^{BWP\_UL}_{RB}$ of resource blocks in the uplink BWP is equal to $N^{BWP\_init}_{RB}$, the maximum number of resource blocks of the uplink BWP that can be allocated by the frequency domain resource allocation field may be $N^{BWP\_UL}_{RB}$ or $N^{BWP\_init}_{RB}$. For example, in a case that the number $N^{BWP\_UL}_{RB}$ of resource blocks in the uplink BWP is greater than $N^{BWP\_init}_{RB}$, the maximum number of resource blocks of the uplink BWP that can be allocated by the frequency domain resource allocation field may be $N^{BWP\_init}_{RB}$.

Regardless of whether or not the number $N^{BWP\_UL}_{RB}$ of resource blocks of the uplink BWP is greater than $N^{BWP\_init}_{RB}$, the maximum number of resource blocks of the uplink BWP that can be allocated by the frequency domain resource allocation field may be $N^{BWP\_init}_{RB}$.

Regardless of whether or not the number $N^{BWP\_UL}_{RB}$ of resource blocks of the uplink BWP is greater than $N^{BWP\_init}_{RB}$, the maximum number of resource blocks of the uplink BWP that can be allocated by the frequency domain resource allocation field may be $N^{BWP\_UL}_{RB}$.

The maximum number of resource blocks in the uplink BWP that can be allocated by the frequency domain resource allocation field may be given based at least on the number $N^{CORESET\_init}_{RB}$ of resource blocks to which the CORESET #0 is mapped. For example, in a case that the number $N^{BWP\_UL}_{RB}$ of resource blocks in the uplink BWP is smaller than $N^{CORESET\_init}_{RB}$, the maximum number of resource blocks of the uplink BWP that can be allocated by the frequency domain resource allocation field may be $N^{BWP\_UL}_{RB}$. For example, in a case that the number $N^{BWP\_UL}_{RB}$ of resource blocks in the uplink BWP is equal to $N^{CORESET\_init}_{RB}$, the maximum number of resource blocks of the uplink BWP that can be allocated by the frequency domain resource allocation field may be $N^{BWP\_UL}_{RB}$ or $N^{CORESET\_init}_{RB}$. For example, in a case that the number $N^{BWP\_UL}_{RB}$ of resource blocks in the uplink BWP is greater than $N^{CORESET\_init}_{RB}$, the maximum number of resource blocks of the uplink BWP that can be allocated by the frequency domain resource allocation field may be $N^{CORESET\_init}_{RB}$.

Regardless of whether or not the number $N^{BWP\_UL}_{RB}$ of resource blocks in the uplink BWP is greater than $N^{CORESET\_init}_{RB}$, the maximum number of resource blocks of the uplink BWP that can be allocated by the frequency domain resource allocation field may be $N^{CORESET\_init}_{RB}$.

Regardless of whether or not the number $N^{BWP\_UL}_{RB}$ of resource blocks of the uplink BWP is greater than $N^{CORESET\_init}_{RB}$, the maximum number of resource blocks of the uplink BWP that can be allocated by the frequency domain resource allocation field may be $N^{BWP\_UL}_{RB}$.

The maximum number of resource blocks in the uplink BWP that can be allocated by the frequency domain resource allocation field may be given based at least on the number $N^{BWP\_init\_UL}_{RB}$ of the resource blocks in the initial uplink BWP. For example, in a case that the number $N^{BWP\_init\_UL}_{RB}$ of resource blocks in the uplink BWP is smaller than $N^{BWP\_init\_UL}_{RB}$, the maximum number of resource blocks of the uplink BWP that can be allocated by the frequency domain resource allocation field may be $N^{BWP\_UL}_{RB}$. For example, in a case that the number $N^{BWP\_UL}_{RB}$ of resource blocks in the uplink BWP is equal to $N^{BWP\_init\_UL}_{RB}$, the maximum number of resource blocks of the uplink BWP that can be allocated by the frequency domain resource allocation field may be $N^{BWP\_UL}_{RB}$ or $N^{BWP\_init\_UL}_{RB}$. For example, in a case that the number $N^{BWP\_UL}_{RB}$ of resource blocks in the uplink BWP is greater than $N^{BWP\_init\_UL}_{RB}$, the maximum number of resource blocks of the uplink BWP that can be allocated by the frequency domain resource allocation field may be $N^{BWP\_init\_UL}_{RB}$.

Regardless of whether or not the number $N^{BWP\_init\_UL}_{RB}$ of resource blocks of the uplink BWP is greater than $N^{BWP\_init\_UL}_{RB}$, the maximum number of resource blocks of the uplink BWP that can be allocated by the frequency domain resource allocation field may be $N^{BWP\_init\_UL}_{RB}$.

Regardless of whether or not the number $N^{BWP\_UL}_{RB}$ of resource blocks of the uplink BWP is greater than $N^{BWP\_init\_UL}_{RB}$, the maximum number of resource blocks of the uplink BWP that can be allocated by the frequency domain resource allocation field may be $N^{BWP\_init\_UL}_{RB}$.

The maximum number of resource blocks in the uplink BWP that can be allocated by the frequency domain resource allocation field may be the number $N^{BWP\_UL}_{RB}$ of resource blocks in the uplink BWP.

An index of a resource block at the beginning of one or multiple resource blocks of the uplink BWP that can be allocated by the frequency domain resource allocation field may be the index $N^{BWP\_init\_UL\_start}_{RB}$ of a resource block at the beginning of one or multiple resource blocks of the initial uplink BWP. An index of a resource block at the beginning of one or multiple resource blocks of the uplink BWP that can be allocated by the frequency domain resource allocation field may be the index $N^{BWP\_UL\_start}_{RB}$ of a resource block at the beginning of one or multiple resource blocks of the uplink BWP. The uplink BWP may be an activated uplink BWP (Active UL BWP).

In a case that the prescribed condition 101 is not satisfied, the payload size of the first uplink DCI format detected in the USS of the control resource set in the downlink BWP may be given based at least on the number $N^{BWP\_init}_{RB}$ of the resource blocks in the initial downlink BWP. The size of the frequency domain resource allocation field included in the first uplink DCI format may be given at least based on the number $N^{BWP\_init}_{RB}$ of the resource blocks of the initial downlink BWP. The maximum number of resource blocks in the uplink BWP that can be allocated by the frequency domain resource allocation field may be given based at least on the number $N^{BWP\_init}_{RB}$ of the resource blocks in the initial downlink BWP. The maximum number of resource blocks in the uplink BWP that can be allocated by the frequency domain resource allocation field may be given based at least on the number $N^{CORESET\_init}_{RB}$ of resource blocks to which the CORESET #0 is mapped. The maximum number of resource blocks in the uplink BWP that can be allocated by the frequency domain resource allocation field may be given based at least on the number $N^{BWP\_init\_UL}_{RB}$ of the resource blocks in the initial uplink BWP. The maximum number of resource blocks in the uplink BWP that can be allocated by the frequency domain resource allocation field may be the number $N^{BWP\_UL}_{RB}$ of resource blocks in the uplink BWP. An index of a resource block at the beginning of one or multiple resource blocks of the uplink BWP that can be allocated by the frequency domain resource allocation field may be the index $N^{BWP\_UL\_start}_{RB}$ of a resource block at the beginning of one or multiple resource blocks of the uplink BWP.

In a case that the prescribed condition 101 is satisfied, the payload size of the first uplink DCI format detected in the USS of the control resource set in the downlink BWP may be given based at least on the number $N^{BWP}_{RB}$ of the resource blocks in the downlink BWP. The size of the frequency domain resource allocation field included in the first uplink DCI format may be given at least based on the number $N^{BWP}_{RB}$ of the resource blocks of the downlink BWP. The maximum number of resource blocks in the uplink BWP that can be allocated by the frequency domain resource allocation field may be given based at least on the number $N^{BWP}_{RB}$ of the resource blocks in the downlink BWP. An index of a resource block at the beginning of one or multiple resource blocks of the uplink BWP that can be allocated by the frequency domain resource allocation field may be the index $N^{BWP\_UL\_start}_{RB}$ of a resource block at the beginning of one or multiple resource blocks of the uplink BWP.

The payload size of the second uplink DCI format detected in the USS of the control resource set in the downlink BWP may be given based at least on the number $N^{BWP\_UL}_{RB}$ of the resource blocks in the uplink BWP. The size of the frequency domain resource allocation field included in the first uplink DCI format may be given at least based on the number $N^{BWP\_UL}_{RB}$ of the resource blocks of the uplink BWP. The maximum number of resource blocks in the uplink BWP that can be allocated by the frequency domain resource allocation field may be given based at least on the number $N^{BWP\_init\_UL}_{RB}$ of the resource blocks in the uplink BWP. An index of a resource block at the beginning of one or multiple resource blocks of the uplink BWP that can be allocated by the frequency domain resource allocation field may be the index $N^{BWP\_UL\_start}_{RB}$ of a resource block at the beginning of one or multiple resource blocks of the uplink BWP.

Various aspects of apparatuses according to one aspect of the present embodiment will be described below.

(1) To accomplish the object described above, aspects of the present invention are contrived to provide the following measures. In other words, the first aspect of the present invention is a terminal apparatus including: a receiver configured to receive a PBCH and monitor a PDCCH including a DCI format in a search space corresponding to a control resource set of an initial downlink BWP, wherein the PBCH includes at least a first higher layer parameter indicating a first offset $N_{offset1}$ associated with a common resource block and a second higher layer parameter indicating a third offset $N_{offset3}$ for a subcarrier, the first offset $N_{offset1}$ indicates a difference from a first subcarrier to a second subcarrier, the first subcarrier is a subcarrier having a lowest frequency of a first common resource block for a first subcarrier spacing, the second subcarrier is multiple subcarriers for a second subcarrier spacing and is a subcarrier having the lowest frequency of the multiple subcarriers to which the PBCH is mapped, the difference from the first subcarrier to the second subcarrier is given by a number of subcarriers defined by the second subcarrier spacing, the third offset $N_{offset3}$ indicates a difference from a second common resource block to the first common resource block, the second common resource block is multiple common resource blocks for a third subcarrier spacing, and is a common resource block having the lowest frequency of the multiple common resource blocks to which the control resource set is mapped, the difference from the second common resource block to the first common resource block is given by a number of common resource blocks defined by the third subcarrier spacing, the number $N^{BWP\_init}_{RB}$ of the common resource blocks in the initial downlink BWP is given based at least on the third offset $N_{offset3}$, the number $N^{CORESET\_init}_{RB}$ of common resource blocks to which the control resource set is mapped, and the number $N^{PBCH\_overlap}_{RB}$ of common resource blocks to which the PBCH is fully or partially mapped, and the number $N^{BWP\_init}_{RB}$ of the common resource blocks, the number $N^{CORESET\_init}_{RB}$ of the common resource blocks, and the number $N^{PBCH\_overlap}_{RB}$ of the common resource blocks are defined by the third subcarrier spacing.

(2) In the first aspect of the present invention, the third subcarrier spacing is given by a third higher layer parameter included in the PBCH.

(3) In the first aspect of the present invention, the first subcarrier spacing and the second subcarrier spacing are first prescribed subcarrier spacing.

(4) In the first aspect of the present invention, the first prescribed subcarrier spacing is 15 kHz.

(5) In the first aspect of the present invention, the first subcarrier spacing is a second prescribed subcarrier spacing, and the second subcarrier spacing is given by the third higher layer parameter.

(6) A second aspect of the present invention is a base station apparatus including: a transmitter configured to transmit a PBCH and transmit a PDCCH including a DCI format in a search space corresponding to a control resource set of an initial downlink BWP, wherein the PBCH includes at least a first higher layer parameter indicating a first offset $N_{offset1}$ associated with a common resource block and a second higher layer parameter indicating a third offset $N_{offset3}$ for a subcarrier, the first offset $N_{offset1}$ indicates a difference from a first subcarrier to a second subcarrier, the first subcarrier is a subcarrier having a lowest frequency of a first common resource block for a first subcarrier spacing, the second subcarrier is multiple subcarriers for a second subcarrier spacing and is a subcarrier having the lowest frequency of the multiple subcarriers to which the PBCH is mapped, the difference from the first subcarrier to the second subcarrier is given by a number of subcarriers defined by the second subcarrier spacing, the third offset $N_{offset3}$ indicates a difference from a second common resource block to the first common resource block, the second common resource block is multiple common resource blocks for a third subcarrier spacing, and is a common resource block having the lowest frequency of the multiple common resource blocks to which the control resource set is mapped, the difference from the second common resource block to the first common resource block is given by a number of common resource blocks defined by the third subcarrier spacing, the number $N^{BWP\_init}_{RB}$ of the common resource blocks in the initial downlink BWP is given based at least on the third offset $N_{offset3}$, the number $N^{CORESET\_init}_{RB}$ of common resource blocks to which the control resource set is mapped, and the number $N^{PBCH\_overlap}_{RB}$ of common resource blocks to which the PBCH is fully or partially mapped, and the number $N^{BWP\_init}_{RB}$ of the common resource blocks, the number $N^{CORESET\_init}_{RB}$ of the common resource blocks, and the number $N^{PBCH\_overlap}_{RB}$ of the common resource blocks are defined by the third subcarrier spacing.

(7) In the second aspect of the present invention, the third subcarrier spacing is given by a third higher layer parameter included in the PBCH.

(8) In the second aspect of the present invention, the first subcarrier spacing and the second subcarrier spacing are first prescribed subcarrier spacing.

(9) In the second aspect of the present invention, the first prescribed subcarrier spacing is 15 kHz.

(10) In the second aspect of the present invention, the first subcarrier spacing is a second prescribed subcarrier spacing, and the second subcarrier spacing is given by the third higher layer parameter.

In the first aspect and/or the second aspect, the first subcarrier spacing may be subcarrier spacing corresponding to a first subcarrier spacing configuration μ.

In the first aspect and/or the second aspect, the second subcarrier spacing may be subcarrier spacing corresponding to a second subcarrier spacing configuration μ.

In the first aspect and/or the second aspect, the third subcarrier spacing may be subcarrier spacing corresponding to a third subcarrier spacing configuration μ.

In the first aspect and/or the second aspect, the first common resource block may be a third point.

In the first aspect and/or the second aspect, the second common resource block may be a second point.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. A "computer-readable recording medium" refers to a portable medium such as a flexible disk, a magneto-optical disk, a ROM, a CD-ROM, and the like, and a storage device such as a hard disk built into the computer system.

The "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. The above-described program may be one for realizing some of the above-described functions, and also may be one capable of realizing the above-described functions in combination with a program already recorded in a computer system.

The base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. The terminal apparatus 1 according to the above-described embodiment can also communicate with the base station apparatus as the aggregation.

The base station apparatus 3 according to the above-described embodiment may be an Evolved Universal Terrestrial Radio Access Network (EUTRAN) and/or a Next-Gen RAN (NG-RAN) or NR RAN. The base station apparatus 3 according to the above-described embodiment may have some or all of the functions of a higher node for an eNodeB and/or a gNB.

Some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. A circuit integration technique is not limited to the LSI, and may be realized with a dedicated circuit or a general-purpose processor. In a case that with advances in semiconductor technology, a circuit integration technology with which an LSI is replaced appears, it is also possible to use an integrated circuit based on the technology.

According to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Visual (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of one aspect of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10, 30 Radio transmission and/or reception unit
11, 31 Antenna unit
12, 32 RF unit
13, 33 Baseband unit
14, 34 Higher layer processing unit
15, 35 Medium access control layer processing unit
16, 36 Radio resource control layer processing unit

What is claimed is:

1. A terminal apparatus for communicating with a base station apparatus in a serving cell, the terminal apparatus comprising:
a processor configured to configure, in the serving cell, a first set of continuous downlink resource blocks in frequency domain, a second set, which is different from the first set, of continuous downlink resource blocks in frequency domain, a third set of continuous uplink resource blocks in frequency domain, and a fourth set, which is different from the third set, of continuous uplink resource blocks in frequency domain;
a receiver configured to monitor a first Physical Downlink Control Channel (PDCCH) with a first Downlink Control Information (DCI) format and a second PDCCH with a second DCI format in the first set when the first set is activated, and to receive a Physical Downlink Shared Channel (PDSCH) scheduled according to the first DCI format in the first set; and
a transmitter configured to transmit, in the third set, a Physical Uplink Shared Channel (PUSCH) scheduled according to the second DCI format when the third set is activated, wherein:
in a case that a number of different sizes of DCI formats monitored using a Common-Radio Network Temporary Identifier (C-RNTI) in the serving cell exceeds three, a size of a first frequency domain resource allocation field included in the first DCI format is provided based on a number of the continuous downlink resource blocks in the second set and a size of a second frequency domain resource allocation field included in the second DCI format is provided based on the fourth set,
the first frequency domain resource allocation field is used for scheduling the continuous downlink resource blocks in the first set, and
the second frequency resource allocation field is used for scheduling the continuous uplink resource blocks in the fourth set.

2. The terminal apparatus according to claim 1, wherein in a case that the number of different sizes of the DCI formats monitored using the C-RNTI does not exceed three in the serving cell, the size of the first frequency domain resource allocation field included in the first DCI format is provided based on the number of the continuous downlink resource blocks in the first set.

3. A base station apparatus for communicating with a terminal apparatus in a serving cell, the base station apparatus comprising:
a processor configured to configure, in the serving cell, a first set of continuous downlink resource blocks in frequency domain, a second set, which is different from the first set, of continuous downlink resource blocks in frequency domain, a third set of continuous uplink resource blocks in frequency domain, and a fourth set, which is different from the third set, of continuous uplink resource blocks in frequency domain;
a transmitter configured to transmit a first Physical Downlink Control Channel (PDCCH) with a first Downlink Control Information (DCI) format and a second PDCCH with a second DCI format in the first set when the first set is activated, and to transmit a Physical Downlink Shared Channel (PDSCH) scheduled according to the first DCI format in the first set; and a receiver configured to receive, in the third set, a Physical Uplink Shared Channel (PUSCH) scheduled according to the second DCI format when the third set is activated, wherein:

in a case that a number of different sizes of DCI formats monitored using a Common-Radio Network Temporary Identifier (C-RNTI) in the serving cell exceeds three, a size of a first frequency domain resource allocation field included in the first DCI format is provided based on a number of the continuous downlink resource blocks in the second set and a size of a second frequency domain resource allocation field included in the second DCI format is provided based on the fourth set, the first frequency domain resource allocation field is used for scheduling the continuous downlink resource blocks in the first set, and the second frequency resource allocation field is used for scheduling the continuous uplink resource blocks in the fourth set.

4. The base station apparatus according to claim 3, wherein in a case that the number of sizes of the DCI formats monitored using the C-RNTI does not exceed three in the serving cell, the size of the first frequency domain resource allocation field included in the first DCI format is provided based on the number of the continuous downlink resource blocks in the first set.

5. A communication method used for a terminal apparatus for communicating with a base station apparatus in a serving cell, the communication method comprising:

configuring, in the serving cell, a first set of continuous downlink resource blocks in frequency domain, a second set, which is different from the first set, of continuous downlink resource blocks in frequency domain, a third set of continuous uplink resource blocks in frequency domain, and a fourth set, which is different from the third set, of continuous uplink resource blocks in frequency domain;

monitoring a first Physical Downlink Control Channel (PDCCH) with a first Downlink Control Information (DCI) format and a second PDCCH with a second DCI format in the first set when the first set is activated;

receiving a Physical Downlink Shared Channel (PDSCH) scheduled according to the first DCI format in the first set; and transmitting, in the third set, a Physical Uplink Shared Channel (PUSCH) scheduled according to the second DCI format when the third set is activated, wherein:

in a case that a number of different sizes of DCI formats monitored using a Common-Radio Network Temporary Identifier (C-RNTI) in the serving cell exceeds three, a size of a first frequency domain resource allocation field included in the first DCI format is provided based on a number of the continuous downlink resource blocks in the second set and a size of a second frequency domain resource allocation field included in the second DCI format is provided based on the fourth set, the first frequency domain resource allocation field is used for scheduling the continuous downlink resource blocks in the first set, and the second frequency resource allocation field is used for scheduling the continuous uplink resource blocks in the fourth set.

6. A communication method used for a base station apparatus for communicating with a terminal apparatus in a serving cell, the communication method comprising:

configuring, in the serving cell, a first set of downlink resource blocks continuous in frequency domain, a second set, which is different from the first set, of continuous downlink resource blocks in frequency domain, a third set of continuous uplink resource blocks in frequency domain, and a fourth set, which is different from the third set, of continuous uplink resource blocks in frequency domain;

transmitting a first Physical Downlink Control Channel (PDCCH) with a first Downlink Control Information (DCI) format and a second PDCCH with a second DCI format in the first set when the first set being activated;

transmitting a Physical Downlink Shared Channel (PDSCH) scheduled according to the first DCI format in the first set; and receiving, in the third set, a Physical Uplink Shared Channel (PUSCH) scheduled according to the second DCI format when the third set is activated, wherein;

in a case that a number of different sizes of DCI formats monitored using a Common-Radio Network Temporary Identifier (C-RNTI) in the serving cell exceeds three, a size of a first frequency domain resource allocation field included in the first DCI format is provided based on a number of the continuous downlink resource blocks in the second set and a size of a second frequency domain resource allocation field included in the second DCI format is provided based on the fourth set, the first frequency domain resource allocation field is used for scheduling the continuous downlink resource blocks in the first set, and the second frequency resource allocation field is used for scheduling the continuous uplink resource blocks in the fourth set.

* * * * *